(12) United States Patent
Ando

(10) Patent No.: US 12,109,830 B2
(45) Date of Patent: Oct. 8, 2024

(54) INK JET INK COMPOSITION AND RECORDING METHOD

(71) Applicant: SEIKO EPSON CORPORATION, Tokyo (JP)

(72) Inventor: Keigo Ando, Matsumoto (JP)

(73) Assignee: SEIKO EPSON CORPORATION (JP)

(*) Notice: Subject to any disclaimer, the term of this patent is extended or adjusted under 35 U.S.C. 154(b) by 154 days.

(21) Appl. No.: 17/856,249

(22) Filed: Jul. 1, 2022

(65) Prior Publication Data

US 2023/0001726 A1 Jan. 5, 2023

(30) Foreign Application Priority Data

Jul. 5, 2021 (JP) .................. 2021-111305

(51) Int. Cl.
| | | |
|---|---|---|
| *B41M 5/00* | (2006.01) | |
| *B41J 11/00* | (2006.01) | |
| *C09D 11/033* | (2014.01) | |
| *C09D 11/107* | (2014.01) | |
| *C09D 11/36* | (2014.01) | |

(52) U.S. Cl.
CPC ........ *B41M 5/0023* (2013.01); *B41J 11/0021* (2021.01); *C09D 11/033* (2013.01); *C09D 11/107* (2013.01); *C09D 11/36* (2013.01)

(58) Field of Classification Search
CPC ...... B41M 5/0023; B41M 7/009; B41M 5/00; B41J 11/0021; C09D 11/033; C09D 11/107; C09D 11/36; C09D 11/322; C09D 11/38
See application file for complete search history.

(56) References Cited

U.S. PATENT DOCUMENTS

| | | |
|---|---|---|
| 2017/0369725 A1 | 12/2017 | Mitsuyoshi et al. |
| 2018/0265725 A1 | 9/2018 | Kagata et al. |
| 2019/0276693 A1* | 9/2019 | Fujita ............... B41M 5/0023 |
| 2021/0170779 A1 | 6/2021 | Asakawa et al. |

FOREIGN PATENT DOCUMENTS

| | | | |
|---|---|---|---|
| CN | 107001835 A | | 8/2017 |
| CN | 112937145 A | | 6/2021 |
| JP | 2013189599 A | * | 9/2013 |
| JP | 2018-154014 A | | 10/2018 |

OTHER PUBLICATIONS

Sugihara et al., (JP 2013/189599 A) "Aqueous Inkjet Ink Composition", Sep. 26, 2013 [Water-soluble organic solvent] (Year: 2013).*

* cited by examiner

*Primary Examiner* — Lisa Solomon
(74) *Attorney, Agent, or Firm* — Harness, Dickey & Pierce, P.L.C.

(57) ABSTRACT

An ink jet ink composition of the present disclosure is a water-based ink which includes a colorant; a surfactant; a fixing resin; and an organic solvent, the surfactant includes a silicone-based surfactant having an HLB value of 10.5 or less, the fixing resin includes an acrylic-based resin having a glass transition temperature of 35° C. to 95° C., and the organic solvent includes a 1,2-alkanediol having 4 carbon atoms or less and an alkanediol having diols at both terminals and 3 to 5 carbon atoms.

14 Claims, 2 Drawing Sheets

INK JET INK COMPOSITION AND RECORDING METHOD

The present application is based on, and claims priority from JP Application Serial Number 2021-111305, filed Jul. 5, 2021, the disclosure of which is hereby incorporated by reference herein in its entirety.

BACKGROUND

1. Technical Field

The present disclosure relates to an ink jet ink composition and a recording method.

2. Related Art

An ink jet recording method to record an image on a recording medium by ejecting fine ink droplets from nozzles of a recording head of an ink jet recording apparatus has been known, and the use of the method described above has also been investigated in a sign printing field, a high-speed label printing field, and the like. In addition, when an image is recorded on an ink low-absorbing recording medium (such as art paper or coated paper) or an ink non-absorbing recording medium (such as a plastic film), in view of global environmental protection, safety for human being, and the like, as the ink, the use of a water-based ink jet ink composition (hereinafter, also called "water-based ink", "ink composition", or "ink" in some cases) containing a fixing resin has also been investigated.

For example, JP-A-2018-154014 has disclosed that in order to prevent drying of an ink composition, propylene glycol which is an organic solvent functioning as a moisturizing agent is contained in the ink composition.

However, when the water-based ink as described above is used, the ink has an inferior conformability to a recording medium, that is, the ink is not likely to wet-spread on the recording medium, and hence for example, a problem in that a sufficient color development property is not obtained may arise. Furthermore, problems, such as an inferior clogging resistance and an inferior adhesion, may also occur.

Accordingly, an ink having an excellent conformability to a recording medium and also having excellent clogging resistance and adhesion at the same time has been desired.

SUMMARY

According to an aspect of the present disclosure, there is provided an ink jet ink composition which is a water-based ink comprising: a colorant; a surfactant; a fixing resin; and an organic solvent. In the ink jet ink composition described above, the surfactant includes a silicone-based surfactant having an HLB value of 10.5 or less, the fixing resin includes an acrylic-based resin having a glass transition temperature of 35° C. to 95° C., and the organic solvent includes a 1,2-alkanediol having 4 carbon atoms or less and an alkanediol having diols at both terminals and 3 to 5 carbon atoms.

According to another aspect of the present disclosure, there is provided a recording method comprising: a step of ejecting the ink jet ink composition of the above aspect by an ink jet method so as to be adhered to a recording medium.

DESCRIPTION OF EXEMPLARY EMBODIMENTS

Figure 1:
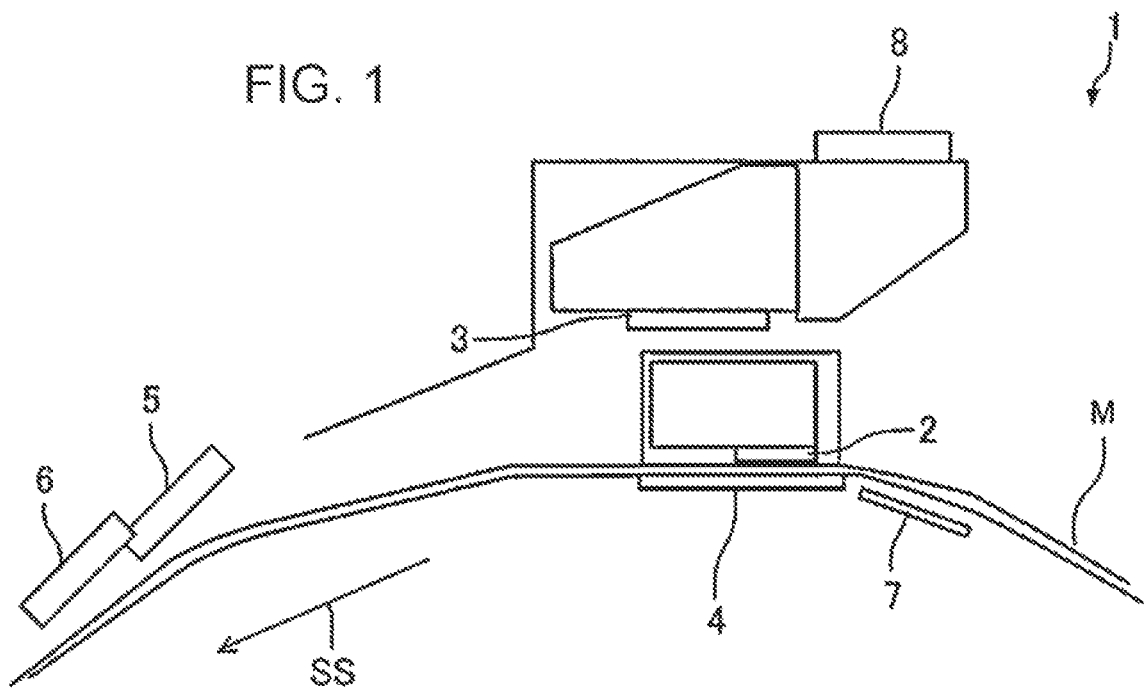
FIG. 1 is a schematic cross-sectional view of an example of an ink jet recording apparatus.

Hereinafter, embodiments of the present disclosure will be described. The following embodiments will describe examples of the present disclosure. The present disclosure is not limited at all to the following embodiments and includes variously changed and/or modified embodiments to be performed without departing from the scope of the present disclosure. In addition, all the components to be described below are not always required to be essential components of the present disclosure.

1. INK JET INK COMPOSITION

An ink jet ink composition according to one embodiment of the present disclosure is a water-based ink which includes a colorant; a surfactant; a fixing resin; and an organic solvent. In this ink jet ink composition, the surfactant includes a silicone-based surfactant having an HLB value of 10.5 or less, the fixing resin includes an acrylic-based resin having a glass transition temperature of 35° C. to 95° C., and the organic solvent includes a 1,2-alkanediol having 4 carbon atoms or less and an alkanediol having diols at both terminals and 3 to 5 carbon atoms.

According to the structure described above, an ink jet ink composition having an excellent conformability to a recording medium and also having excellent clogging resistance and adhesion can be provided.

In recording on a recording medium, when an ink conformability to the recording medium is not superior, that is, when an ink is not likely to wet-spread on the recording medium, for example, a problem such that a sufficient color development property is not obtained may arise. In particular, in recording to be performed on a low-absorbing or a non-absorbing recording medium (in particular, a film), the problem described above tends to become serious.

In these days, when a silicone-based surfactant having a predetermined HLB value or less is contained in an ink, even if recording is performed on a low-absorbing or a non-absorbing recording medium, the ink is likely to wet-spread, and hence, a sufficient color development property is obtained.

On the other hand, the silicone-based surfactant having a relatively low HLB value equal to or lower than a predetermined value tends to dissolve or swell an acrylic-based fixing resin when the ink is dried. That is, in the state in which water contained in the ink is evaporated and in which a solid content, such as the fixing resin or the like, and/or an organic solvent is condensed, the silicone-based surfactant having a relatively low HLB value tends to dissolve or swell the fixing resin. Accordingly, when the ink is dried in a recording head, the fixing resin is welded to cause clogging in some cases. That is, although an ink containing a silicone-based surfactant having a predetermined HLB value or less and an acrylic-based fixing resin having a glass transition temperature in a predetermined range has an excellent conformability to a recording medium, when the ink is dried, the fixing resin is liable to be welded in a recording head, and as a result, a clogging problem may occur.

However, in order to prevent the clogging caused by this drying, when a content of an organic solvent functioning as a moisturizing agent is increased, and/or when an organic solvent having a high moisture retaining property is contained, a drying property of the ink is degraded, and as a result, the adhesion thereof is degraded. As described above, in the past, the clogging resistance and the adhesion were difficult to obtain at the same time.

In order to obtain the clogging resistance, the use of an organic solvent in the ink is considered. As the organic solvent, a 1,2-alkanediol having 4 carbon atoms or less may be mentioned.

As a moisturizing agent used for the ink, a 1,2-alkanediol having 4 carbon atoms or less has an excellent drying property in a drying step to complete the recording, and the adhesion between the ink and a recording medium is likely to be made preferable thereby; however, since the moisturizing property thereof may not be sufficient so as to prevent the dissolution and/or the swelling of an acrylic-based fixing resin caused by a silicone-based surfactant having a relatively low HLB value, the fixing resin is swelled, and the clogging is generated.

On the other hand, in order to secure the moisture retaining property, when a content of an organic solvent functioning as a moisturizing agent is simply increased, and/or when an organic solvent having a high moisture retaining property is simply contained, the drying property of the ink is degraded, and as a result, the adhesion to a recording medium is degraded.

Through intensive research carried out by the present inventor, it was found that when a 1,2-alkanediol having 4 carbon atoms or less and an alkanediol having diols at both terminals and 3 to 5 carbon atoms are used in combination, the drying property and the moisture retaining property can be obtained at the same time. That is, although having not a sufficient moisture retaining property so as to prevent the dissolution and/or the swelling of a fixing resin caused by a silicone-based surfactant having a relatively low HLB value, the 1,2-alkanediol having 4 carbon atoms or less has an excellent drying property. On the other hand, although having a more excellent moisture retaining property and being capable of securing a sufficient clogging resistance, the alkanediol having diols at both terminals and 3 to 5 carbon atoms is inferior in terms of the drying property and the adhesion. When the two types of alkanediols described above were used in combination, the clogging resistance and the adhesion could be obtained at the same time.

Hereinafter, the components which are contained in the ink jet ink composition according to this embodiment and components which may be contained therein will be described.

1.1. Colorant

The ink jet ink composition according to this embodiment contains a colorant. As the colorant, at least one of a pigment and a dye may be used.

Pigment

When the pigment is used as the colorant, a light resistance of the ink composition can be improved. As the pigment, an inorganic pigment and/or an organic pigment may be used. As the pigment, for example, there may be mentioned a color pigment, such as a cyan, a yellow, a magenta, or a black pigment, or a special color pigment, such as a white pigment or a bright pigment.

As the organic pigment, for example, there may be mentioned a quinacridone-based pigment, a quinacridone quinone-based pigment, a dioxane-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, a thioindigo-based pigment, an isoindolinone-based pigment, an azomethine-based pigment, a dye chelate, a dye lake, a nitro-based pigment, a nitroso-based pigment, an aniline black, or an azo pigment, such as an insoluble azo pigment, a condensed azo pigment, an azo lake, or a chelate azo pigment.

As a concrete example of the organic pigment, the following may be mentioned.

As the cyan pigment, for example, C.I. Pigment Blue 1, 2, 3, 15:3, 15:4, 16, 22, or 60, or C.I. Vat Blue 4 or 60 may be mentioned, and one selected from the group consisting of C.I. Pigment Blue 15:3, 15:4, and 60 or a mixture of at least two thereof is preferable.

As the magenta pigment, for example, C.I. Pigment Red 5, 7, 12, 48(Ca), 48(Mn), 57(Ca), 57:1, 112, 122, 123, 168, 184, 202, or 209, or C.I. Pigment Violet 19 may be mentioned, and one selected from the group consisting of C.I. Pigment Red 122, 202, and 209, and C.I. Pigment Violet 19 or a mixture of at least two thereof is preferable.

As the yellow pigment, for example, C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, or 185 may be mentioned, and one selected from the group consisting of C.I. Pigment Yellow 74, 109, 110, 128, and 138 or a mixture of at least two thereof is preferable.

As the orange pigment, for example, C.I. Pigment Orange 36 or 43 or a mixture thereof may be mentioned.

As the green pigment, for example, C.I. Pigment Green 7 or 36 or a mixture thereof may be mentioned.

As the black pigment, for example, a furnace black, a lamp black, an acetylene black, or a channel black (C.I. Pigment Black 7) may be mentioned, and as a commercially available product thereof, for example, there may be mentioned No. 2300, No. 900, MCF88, No. 20B, No. 33, No. 40, No. 45, No. 52, MA7, MA8, MA100, or No. 2200B (trade name, manufactured by Mitsubishi chemical Co., Ltd.); Color Black FW1, FW2, FW2V, FW18, FW200, S150, S160, or S170, Printex 35, U, V, or 140U, or Special Black 6, 5, 4A, 4, or 250 (trade name, manufactured by Degussa AG.); Conductex SC, Raven 1255, 5750, 5250, 5000, 3500, 1255, or 700 (trade name, manufactured by Columbia Carbon Inc.); or Regal 400R, 330R, or 660R, Mogul L, Monarch 700, 800, 880, 900 1000, 1100, 1300, or 1400, or Elftex 12 (trade name, manufactured by Cabot Corporation). Those carbon blacks may be used alone, or at least two types thereof may be used as a mixture.

Although the bright pigment is not particularly limited as long as having a bright property when being adhered to a medium, for example, there may be mentioned metal particles (also called a metal pigment) of one selected from the group consisting of aluminum, silver, gold, platinum, nickel, chromium, tin, zinc, indium, titanium, copper, and an alloy containing at least two of those mentioned above or a pearl pigment having pearly glossiness. As a representative example of the pearl pigment, for example, a pigment, such as titanium dioxide-coated mica, argentine, or bismuth oxychloride, having pearly glossiness or interference glossiness may be mentioned. In addition, the bright pigment may be surface-treated in order to suppress a reaction with water.

In addition, as the white pigment, for example, a metal oxide or a metal compound, such as barium sulfate or calcium carbonate, may be mentioned. As the metal oxide, for example, titanium dioxide, zinc oxide, silica, alumina, or magnesium oxide may be mentioned. In addition, as the white pigment, particles each having a hollow structure may also be used.

The pigments mentioned above may be used alone, or at least two types thereof may be used in combination. In view of a storage stability, such as a light resistance, a weather resistance, or a gas resistance, the pigment is preferably an organic pigment.

Dispersion Method

When the pigment is used as the colorant, the pigment is preferably added to the water-based ink composition in the form of a pigment dispersion liquid which is obtained by dispersing the pigment in water using a dispersant, by dispersing in water, a self-dispersible surface-treated pigment in which a hydrophilic group is introduced on surfaces of pigment particles using a chemical reaction, or by dispersing a polymer-coated pigment in water.

Although the dispersant is not particularly limited, for example, a high molecular weight dispersant or a surfactant may be mentioned. Although the high molecular weight dispersant is not particularly limited, for example, there may be mentioned a protein, such as a glue, a gelatin, a casein, or an albumin; a natural rubber, such as a gum arabic or a gum tragacanth; a glucoside such as a saponin; an alginic-acid fermented material of propylene glycol alginate, tri-ethanolamine alginate, or ammonium alginate; a cellulose derivative, such as a methyl cellulose, a carboxymethyl cellulose, or an ethyl hydroxycellulose; a poly(vinyl alcohol), a polypyrrolidone, an acrylic-based resin, such as a polyacrylic acid, an acrylic acid-acrylonitrile copolymer, a potassium acrylate-acrylonitrile copolymer, a vinyl acetate-acrylate ester copolymer, or an acrylic acid-acrylate ester copolymer; a styrene-acrylic-based copolymer, such as a styrene-acrylic acid copolymer, a styrene-methacrylic acid copolymer, a styrene-methacrylic acid-acrylate ester copolymer, or a styrene-m-methylstyrene-acrylic acid copolymer; a styrene-maleic acid copolymer, a styrene-maleic anhydride copolymer, a vinylnaphthalene-acrylic acid copolymer, a vinyl acetate-based copolymer, such as a vinyl acetate-ethylene copolymer, a vinyl acetate-fatty acid vinylethylene copolymer, a vinyl acetate-maleate ester copolymer, a vinyl acetate-crotonic acid copolymer, or a vinyl acetate-acrylic acid copolymer; or a salt of each of those materials mentioned above. Although the surfactant is not particularly limited, for example, an anionic surfactant, a nonionic surfactant, or an amphoteric surfactant may be mentioned.

The above self-dispersible surface-treated pigment in which a hydrophilic group is introduced is configured to be dispersed or dissolved in water without using a dispersant by a surface treatment performed such that a carboxy group and/or its salt is directly bonded to the surface of the pigment. In more particular, by a physical treatment using vacuum plasma or a chemical treatment using sodium hypochlorite or ozone as an oxidant, when functional groups or molecules having functional groups are grafted on the surface of the pigment, the above self-dispersible surface-treated pigment can be obtained. The number of types of functional groups to be grafted on one pigment particle may be one or at least two. The type of functional group and the degree of grafting thereof may be appropriately determined in consideration of the dispersion stability in the water-based ink composition, the color density, and the drying property in front of a recording head.

Although not particularly limited, the polymer-coated pigment described above may be obtained for example, such that after the pigment is dispersed using a dispersant having a polymerizable group, an emulsion polymerization is performed in water using a monomer (copolymerizable monomer) copolymerizable with the dispersant described above and a photo-radical polymerization initiator. As the polymer mentioned above, a polymer may be preferably used which is obtained by polymerization performed by a known polymerization method using a monomer or an oligomer having at least one selected from the group consisting of an acryloyl group, a methacryloyl group, a vinyl group, and an allyl group as a double bond with a photo-radical polymerization initiator. The emulsion polymerization may be performed by a general method, and the polymerization proceeds under the presence of an emulsifier by free radicals generated by thermal decomposition of a water-soluble photo-radical polymerization initiator.

The pigment and the dispersant which collectively form the pigment dispersion liquid each may be used alone, or at least two types thereof may be used in combination.

Dye

In the ink composition, the dye may also be used as the colorant. The dye is not particularly limited, and for example, an acidic dye, a direct dye, a reactive dye, a basic dye, or a dispersive dye may be used. As the dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94, C.I. Food Black 1 or 2, C.I. Direct Yellow 1, 12, 24, 33, 50, 55, 58, 86, 132, 142, 144, or 173, C.I. Direct Red 1, 4, 9, 80, 81, 132, 225, or 227, C.I. Direct Blue 1, 2, 15, 71, 86, 87, 98, 165, 199, or 202, C.I. Direct Black 19, 38, 51, 71, 154, 168, 171, or 195, C.I. Reactive Red 14, 32, 55, 79, 141, or 249, or C.I. Reactive Black 3, 4, or 35.

Regardless of whether the pigment or the dye is used, those colorants may be used alone, or at least two types thereof may be used in combination.

A total content of the colorant with respect to a total mass (100 percent by mass) of the ink composition is preferably 0.5 to 20 percent by mass, more preferably 1 to 10 percent by mass, and further preferably 2 to 8 percent by mass.

1.2. Surfactant

The ink jet ink composition according to this embodiment contains a surfactant, and the surfactant includes a silicone-based surfactant having an HLB value of 10.5 or less.

1.2.1. Silicone-Based Surfactant Having HLB Value of 10.5 or Less

The HLB value of a silicone-based surfactant having an HLB value of 10.5 or less is defined as described below.

The "HLB value (hydrophilic lipophilic balance)" in the present disclosure is a value calculated by Griffin method. In particular, the HLB value of a surfactant can be calculated by the following equation (H).

$$\text{HLB Value} = 20 \times (\text{percent by mass of hydrophilic group}) \quad \text{(H)}$$

The HLB value is a value to be determined by the balance between a hydrophilic group and a lipophilic group of a surfactant molecule, a high HLB value indicates a surfactant having a high hydrophilic property, and a low HLB value indicates a surfactant having a high lipophilic property.

The HLB value of the silicone-based surfactant contained in the ink jet ink composition according to this embodiment is preferably 2 to 10.5. An upper limit of the HLB value of the silicone-based surfactant may be 9 or less, 8 or less, 6 or less, or 5 or less. In addition, a lower limit of the HLB value of the silicone-based surfactant described above may be 2.5 or more, 3 or more, or 4 or more. Furthermore, the lower limit described above may also be 6 or more, 7 or more, 8 or more, or 9 or more.

When the upper limit of the HLB value of the silicone-based surfactant is in the range described above, since wet-spreadability of the ink is further improved, the conformability tends to be further improved. In addition, when the lower limit of the HLB value of the silicone-based surfactant is in the range described above, welding of the acrylic-based resin is suppressed, and the clogging resistance tends to be further improved. Hence, when the HLB value of the silicone-based surfactant is in the range described above, the conformability and the clogging resistance tend to be improved with a good balance.

As a commercially available product of the silicone-based surfactant having an HLB value of 10.5 or less, for example, there may be mentioned KF-353 (HLB=10), KF-945 (HLB=4), KF-6020 (HLB=4), X-22-6191 (HLB=2), X-22-4515 (HLB=5), KF-6015 (HLB=5), KF-6017 (HLB=5), or KF-6038 (HLB=3) (trade name, manufactured by Shin-Etsu Chemical Co., Ltd.); FZ-2116 (HLB=5) or FZ-2120 (HLB=6) (trade name, manufactured by Dow Toray Co., Ltd.); EMALEX-SS-5602 (HLB=9) (trade name, manufactured by Nihon Emulsion Co., Ltd.); Silfase SAG005 (HLB=7) (trade name, manufactured by Nisshin Chemical Industry Co., Ltd.); or Tego Wet 280 (HLB=3.5) (trade name, manufactured by Evonik Degussa).

A content of the silicone-based surfactant having an HLB value of 10.5 or less with respect to the total mass of the ink composition is preferably 0.01 to 2.0 percent by mass, more preferably 0.05 to 1.50 percent by mass, even more preferably 0.10 to 1.3 percent by mass, and further preferably 0.30 to 1.0 percent by mass.

1.2.2. Other Surfactants

The surfactant contained in the ink jet ink composition according to this embodiment may contain as other surfactants, a silicone-based surfactant having an HLB value of more than 10.5, an acetylene glycol-based surfactant, a polyoxyalkylene alkyl ether-based surfactant, a fluorine-based surfactant, and/or the like.

As a commercially available product of the silicone-based surfactant having an HLB value of more than 10.5, for example, BYK348 (HLB=14.6) (manufactured by BYK Japan KK) disclosed in JP-A-2017-213797 may be mentioned.

As a commercially available product of the acetylene glycol-based surfactant, for example, there may be mentioned Surfynol SE (HLB=6), Surfynol 61 (HLB=6), Surfynol 104 (HLB=4), Surfynol 420 (HLB=4), Surfynol 82 (HLB=4), Surfynol DF110D (HLB=3), Surfynol 104S (HLB=4), Surfynol 104PG50 (HLB=4), Surfynol 420 (HLB=4), Surfynol 82 (HLB=4), or Surfynol MD-20 (HLB=4) (trade name, manufactured by Nisshin Chemical Industry Co., Ltd.).

As a commercially available product of the polyoxyalkylene alkyl ether-based surfactant, for example, there may be mentioned Noigen DH-0300 (HLB=4), Noigen ET-116B (HLB=12), Noigen DL-0415 (HLB=15), Noigen ET-106A (HLB=10.9), Noigen DH-0300 (HLB=4), Noigen YX-400 (HLB=18), or Noigen EA-160 (HLB=15.4) (trade name manufactured by DKS Co., Ltd.); Newcol 1006 (trade name, polyoxyalkylene alkyl ether-based surfactant, manufactured by Nippon Nyukazai Co., Ltd.); Emulgen 1108 (HLB=13.4) (trade name, polyoxyalkylene alkyl ether-based surfactant, manufactured by Kao Corporation).

The surfactants mentioned above may be used alone, or at least two types thereof may be used in combination.

A content of the surfactant with respect to the total mass of the ink composition is preferably 0.01 to 2.0 percent by mass, more preferably 0.05 to 1.50 percent by mass, even more preferably 0.10 to 1.00 percent by mass, and further preferably 0.30 to 1.00 percent by mass.

1.3. Fixing Resin

The ink jet ink composition according to this embodiment contains a fixing resin. The fixing resin includes an acrylic-based resin having a glass transition temperature of 35° C. to 95° C.

The fixing resin indicates a resin having a function to improve the adhesion and an abrasion resistance of a recorded matter when being contained in the ink composition. This function is obtained such that as the ink composition is dried, the fixing resin and other components, such as the colorant, are welded to each other and fixed to a recording medium. The fixing resin may be used in the form of a water-soluble resin or an emulsion of resin particles, and the emulsion of resin particles is preferable.

1.3.1. Acrylic-Based Resin Having Glass Transition Temperature of 35° C. to 95° C.

The ink jet ink composition according to this embodiment contains a fixing resin which includes an acrylic-based resin having a glass transition temperature of 35° C. to 95° C.

The acrylic-based resin is a generic name of a polymer obtained by polymerization using at least one acrylic-based monomer, such as (meth)acrylic acid or a (meth)acrylate ester, as one component, and for example, a resin obtained from an acrylic-based monomer or a copolymer of an acrylic-based monomer and a monomer different therefrom may be mentioned. As the copolymer of an acrylic-based monomer and a monomer different therefrom, for example, an acrylic-vinyl-based resin which is a copolymer between an acrylic-based monomer and a vinyl-based monomer may be mentioned. As the acrylic-vinyl-based resin, for example, a styrene-acrylic resin which is a copolymer between a styrene-based monomer and an acrylic-based monomer may be mentioned.

In addition, in this specification, the acrylic-based resin may be a styrene-acrylic resin as described above. In addition, in this specification, "(meth)acryl" indicates at least one of acryl and methacryl.

As the acrylic-based monomer, for example, there may be mentioned (meth)acrylic acid; an alkyl (meth)acrylate, such as methyl (meth)acrylate, ethyl (meth)acrylate, butyl (meth)acrylate, or 2-ethylhexyl (meth)acrylate; a hydroxy group-containing (meth)acrylate such as 2-hydroxyethyl (meth)acrylate; an amino group-containing (meth)acrylate such as dimethylaminoethyl (meth)acrylate; or a glycidyl group-containing (meth)acrylate such as glycidyl (meth)acrylate).

As the styrene-based monomer, for example, styrene, α-methylstyrene, p-methoxystyrene, p-hydroxystyrene, or p-acetoxystyrene may be mentioned.

The styrene-acrylic resin may also be a copolymer obtained from a styrene-based monomer, an acrylic-based monomer, and another monomer. As the another monomer, a monomer copolymerizable with a styrene-based monomer and an acrylic-based monomer may be mentioned. In more particular, a nitrile-based monomer such as acrylonitrile, a vinyl ester such as vinyl acetate, a vinyl ether such as vinyl ethyl ether, or an unsaturated carboxylic acid or its anhydride may be mentioned.

As the acrylic-based resin, although those resins may be used alone, or at least two types thereof may be used in combination, a styrene-acrylic resin is preferably included. When the acrylic-based resin includes a styrene-acrylic resin, the adhesion tends to be further improved.

The acrylic-based resin may be prepared by a known method, or a commercially available product thereof may also be used. As the commercially available product, for example, Joncryl 62J (Tg=85° C.) (trade name, styrene-acrylic resin, manufactured by BASF) may be mentioned.

As a known preparation method, the following method may be mentioned. That is, after a reaction chamber equipped with a dripping device, a thermometer, a water-cooling reflux condenser, and a stirrer is prepared, ion exchange water is charged in this reaction chamber, and potassium persulfate functioning as a polymerization initiator is added at 70° C. in a nitrogen atmosphere with stirring. Next, a monomer solution containing styrene and acrylic acid is prepared. This monomer solution is dripped in the reaction chamber described above to perform a reaction for polymerization, so that a resin is obtained.

A glass transition temperature (Tg) of an acrylic-based resin can be adjusted, for example, by changing mass ratios of monomers in a monomer solution containing a styrene-based monomer and an acrylic-based monomer. In more particular, after a Tg of a homopolymer of each monomer is confirmed, when the Tg of the acrylic-based resin is increased, a mass ratio of a monomer having a high Tg is increased, and when the Tg of the acrylic-based resin is decreased, a mass ratio of a monomer having a low Tg is increased, so that the glass transition temperature of the acrylic-based resin can be adjusted.

The glass transition temperature of the acrylic-based resin included in the fixing resin is 35° C. to 95° C. and preferably 40° C. to 90° C. An upper limit of the glass transition temperature of the acrylic-based resin is preferably 85° C. or less and may be 80° C. or less, 70° C. or less, or 65° C. or less. A lower limit of the glass transition temperature of the acrylic-based resin is preferably 45° C. or more, more preferably 50° C. or more, and further preferably 55° C. or more. When the glass transition temperature of the acrylic-based resin is in the range described above, the clogging resistance and the adhesion tend to be made more preferable at the same time.

In addition, the object of the present disclosure is based on the problem in that, although an acrylic-based resin which originally causes no clogging by heating in a primary heating step which will be described below is used, a clogging problem is generated since a silicone-based surfactant having a predetermined HLB value or less is contained. That is, when the acrylic-based resin has a glass transition temperature of 35° C. or more, the problem to be overcome by the present disclosure is generated.

The glass transition temperature of the acrylic-based resin may be measured by a differential scanning calorimetry (DSC) in accordance with JIS K7121: 1987. As a commercially available product of a differential scanning calorimeter (DSC), for example, "DSC6220" (trade name, manufactured by Seiko Electronics C., Ltd.) may be mentioned.

A content of the acrylic-based resin with respect to the total mass of the ink composition as a solid content is preferably 0.1 to 10 percent by mass, more preferably 0.3 to 7 percent by mass, even more preferably 0.5 to 5 percent by mass, further preferably 0.7 to 3 percent by mass, and even further preferably 0.8 to 2 percent by mass.

1.3.2. Other Fixing Resins

The ink jet ink composition according to this embodiment may also contain as the fixing resin, a resin other than the acrylic-based resin having a glass transition temperature of 35° C. to 95° C. As the resin of the fixing resin described above, for example, there may be mentioned an urethane-based resin, a fluorene-based resin, a polyolefin-based resin, a rosin modified resin, a terpene-based resin, a polyester-based resin, a polyamide-based resin, an epoxy-based resin, a vinyl chloride-based resin, or an ethylene-vinyl acetate-based resin.

The urethane-based resin is a generic name of a resin having an urethane bond. As the urethane-based resin, a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond may also be used. As the urethane-based resin, a commercially available product may also be used, and for example, at least one selected from commercially available products, such as Superflex 210, 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6020, WS-6021, and W-512-A-6 (trade name, manufactured by Mitsui Chemicals Polyurethane Inc.); Suncure 2710 (trade name, manufactured by Lubrizol); and Permarin UA-150 (trade name, manufactured by Sanyo Chemical Industries, Ltd.) may be used.

The vinyl chloride-based resin may be a vinyl chloride-vinyl acetate copolymer.

The polyolefin-based resin is a resin having a structural skeleton of an olefin, such as ethylene, propylene, or butylene, and a known olefin-based resin may be appropriately selected and used. As the olefin-based resin, a commercially available product may be used, and for example, one selected from Arrowbase CB-1200 and CD-1200 (trade name, manufactured by Unitika Ltd.) may be used.

In addition, the fixing resin may be supplied in the form of an emulsion, and as an example of a commercially available product of the resin emulsion as described above, for example, there may be used Polysol SH-502 (vinyl acetate resin emulsion), Polysol AD-13, AD-2, AD-10, AD-96, AD-17, or AD-70 (ethylene-vinyl acetate resin emulsion), or Polysol PSASE-6010 (ethylene-vinyl acetate resin emulsion) (trade name, manufactured by Showa Denko K.K.); Seikadyne 1900W (trade name, ethylene-vinyl acetate resin emulsion, manufactured by Dainichiseika Color & Chemicals Mfg. Co., Ltd.); Vinyblan 700 or 2586 (trade name, manufactured by Nisshin Chemical Industry Co., Ltd.); Elitel KA-5071S, KT-8803, KT-9204, KT-8701, KT-8904, or KT-0507 (trade name, polyester resin emulsion, manufactured by Unitika Ltd.); Hitech SN-2002 (trade name, polyester resin emulsion, manufactured by Toho Chemical Industry Co., Ltd.); Takelac W-6020, W-635, W-6061, W-605, W-635, or W-6021 (trade name, urethane-based resin emulsion, manufactured by Mitsui Chemicals Polyurethane Inc.); Superflex 870, 800, 150, 420, 460, 470, 610, 620, or 700 (trade name, urethane-based resin emulsion, manufactured by DKS Co., Ltd.); Permarin UA-150 (trade name, urethane-based resin emulsion, manufactured by Sanyo Chemical Industries, Ltd.); Suncure 2710 (trade name, urethane-based resin emulsion, manufactured by Lubrizol); NeoRez R-9660, R-9637, or R-940 (trade name, urethane-based resin emulsion, manufactured by Kusumoto Chemicals, Ltd.); Adeka Bontighter HUX-380 or 290K (trade name, urethane-based resin emulsion, manufactured by ADEKA Corporation); Movinyl 966A or Movinyl 7320 (trade name, manufactured by Japan Coating Resin Corporation); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); NK Binder R-5HN (trade name, manufactured by shin-Nakamura Chemical Co., Ltd.); or Hydran WLS-210 (trade name, non-crosslinked polyurethane, manufactured by DIC Corporation).

The fixing resin may be used alone, or at least two types thereof may be used in combination.

A content of the fixing resin with respect to the total mass of the ink composition as a solid content is preferably 0.1 to 10 percent by mass, more preferably 0.3 to 7 percent by mass, even more preferably 0.5 to 5 percent by mass, further preferably 0.7 to 3 percent by mass, and even further preferably 0.8 to 2 percent by mass.

1.4. Organic Solvent

The ink jet ink composition according to this embodiment contains an organic solvent, and the organic solvent includes a 1,2-alkanediol having 4 carbon atoms or less and an alkanediol having diols at both terminals and 3 to 5 carbon atoms.

1.4.1. 1,2-Alkanediol Having 4 Carbon Atoms or Less

The 1,2-alkanediol having 4 carbon atoms or less is an alkanediol in which hydroxy groups are bonded to the 1-position and the 2-position of a main chain of a linear or branched alkane having 4 carbon atoms or less. In addition, the main chain indicates the longest length of carbon atoms bonded to each other. The alkane preferably has a linear structure.

As the 1,2-alkanediol having 4 carbon atoms or less, for example, 1,2-ethanediol (ethylene glycol), 1,2-propanediol (propylene glycol), 1,2-butanediol, or 2-methyl-1,2-propanediol may be mentioned. Among those mentioned above, since the conformability, the adhesion, and the drying property can be further improved, as the 1,2-alkanediol having 4 carbon atoms or less, either propylene glycol or 1,2-butanediol is preferably contained, and propylene glycol is particularly preferably contained. In addition, the number of carbon atoms is preferably 3.

A standard boiling point of the 1,2-alkanediol having 4 carbon atoms or less is preferably 200° C. or less, more preferably less than 200° C., even more preferably 190° C. or less, and further preferably 160° C. to 190° C.

Since having a relatively low standard boiling point in many cases, the 1,2-alkanediol having 4 carbon atoms or less is estimated to contribute to excellent drying property and excellent adhesion; however, besides the relatively low standard boiling point described above, the 1,2-alkanediol having 4 carbon atoms or less itself is estimated to be excellent in drying property and adhesion.

A content of the 1,2-alkanediol having 4 carbon atoms or less with respect to the total mass of the ink composition is preferably 1 to 25 percent by mass, more preferably 3 to 20 percent by mass, even more preferably 5 to 15 percent by mass, and further preferably 8 to 13 percent by mass.

1.4.2. Alkanediol Having Diols at Both Terminals and 3 to 5 Carbon Atoms

The alkanediol having diols at both terminals and 3 to 5 carbon atoms is an alkanediol in which hydroxy groups are boned to both terminals of a main chain of a linear or branched alkane having 3 to 5 carbon atoms. In addition, the main chain indicates the longest length of carbon atoms bonded to each other. The alkane preferably has a linear structure.

As the alkanediol having diols at both terminals and 3 to 5 carbon atoms, for example, 1,3-propanediol, 1,4-butanediol, 1,5-pentanediol, 2-methyl-1,3-propanediol, or 2-methyl-1,4-butanediol may be mentioned. Among those mentioned above, since the clogging resistance and the adhesion can be made more preferable at the same time, the alkanediol having diols at both terminals and 3 to 5 carbon atoms preferably includes one of 1,3-propanediol, 1,4-butanediol, and 1,5-pentanediol. In addition, the number of carbon atoms is preferably 3 or 4 and more preferably 3.

A standard boiling point of the alkanediol having diols at both terminals and 3 to 5 carbon atoms is preferably 120° C. or more, more preferably 200° C. or more, even more preferably 200° C. to 260° C., further preferably 200° C. to 230° C., and even further preferably 200° C. to 220° C.

The standard boiling point of the alkanediol having diols at both terminals and 3 to 5 carbon atoms is preferably higher than the standard boiling point of the 1,2-alkanediol having 4 carbon atoms or less and is higher than that more preferably by 5° C. to 60° C., even more preferably by 10° C. to 40° C., and further preferably by 20° C. to 30° C.

A content of the alkanediol having diols at both terminals and 3 to 5 carbon atoms with respect to the total mass of the ink composition is preferably 1 to 25 percent by mass, more preferably 3 to 20 percent by mass, even more preferably 4 to 15 percent by mass, and further preferably 6 to 10 percent by mass.

In the ink jet ink composition according to this embodiment, a mass ratio (B/A) of a content B of the alkanediol having diols at both terminals and 3 to 5 carbon atoms with respect to the total mass of the ink composition to a content A of the 1,2-alkanediol having 4 carbon atoms or less with respect to the total mass of the ink composition is preferably 0.1 to 1.5. A lower limit of the mass ratio (B/A) is preferably 0.1 or more, more preferably 0.2 or more, even more preferably 0.3 or more, further preferably 0.35 or more, and particularly preferably 0.45 or more. In addition, an upper limit of the mass ratio (B/A) is preferably 1.3 or less, more preferably 1.2 or less, even more preferably 1.0 or less, and further preferably less than 1.0, even further preferably 0.8 or less, and particularly preferably 0.6 or less. When the mass ratio (B/A) is in the range described above, the moisture retaining property and the drying property can be made more preferable at the same time with a good balance, and the clogging resistance, the adhesion, and the drying property can be made more preferable at the same time.

In addition, since the conformability, the adhesion, and the drying property can be further improved, as the mass ratio (B/A), a mass ratio (B/A) of the content B of the alkanediol having diols at both terminals and 3 to 5 carbon atoms with respect to the total mass of the ink composition to a content A of propylene glycol with respect to the total mass of the ink composition is preferably used.

1.4.3. Other Organic Solvents

As an organic solvent other than those mentioned above, the organic solvent may also include, for example, a polyol (excluding the 1,2-alkanediol having 4 carbon atoms or less and the alkanediol having diols at both terminals and 3 to 5 carbon atoms), an ester, a cyclic ester, an alkylene glycol ether, and/or a nitrogen-containing solvent.

Polyol

The polyol may be classified into an alkanediol and a polyvalent alcohol. The polyol includes an alkane polyol in which hydrogen atoms of an alkane are substituted by at least two hydroxy groups and an intermolecular condensate in which alkane polyols are condensed with each other.

As the alkanediol, for example, a 1,2-alkanediol having 5 carbon atoms or more, an alkanediol having diols at both terminals and 6 carbon atoms or more, and other diols may be mentioned.

As the 1,2-alkanediol having 5 carbon atoms or more, for example, 1,2-pentanediol, 1,2-hexanediol, 1,2-heptanediol, or 1,2-octanediol may be mentioned.

As the alkanediol having diols at both terminals and 6 carbon atoms or more, for example, 1,6-hexanediol, 1,7-heptanediol, 1,8-octanediol, or 3-methyl-1,5-pentanediol may be mentioned.

As the other diols, for example, hexylene glycol (2-methyl-2,4-pentanediol), 3-methyl-1,3-butanediol, 2-ethyl-1,3-hexanediol, diethylene glycol, triethylene glycol, dipropylene glycol, or tripropylene glycol may be mentioned.

The alkanediol may have either a linear or a branched structure. Although an upper limit of the number of carbon atoms is not particularly limited, the upper limit described above is preferably 10 or less, more preferably 8 or less, and further preferably 6 or less.

The polyvalent alcohol has a molecular structure in which at least three hydroxy groups are bonded to an alkane. As the polyvalent alcohol, for example, trimethylolpropane, glycerin, 1,2,6-hexanetriol, or pentaerythritol may be mentioned.

The polyvalent alcohol may have either a linear or a branched structure. Although an upper limit of the number of carbon atoms is not particularly limited, the upper limit described above is preferably 10 or less, more preferably 6 or less, and further preferably 4 or less. Although an upper limit of the number of hydroxy groups is not particularly limited, the upper limit described above is preferably 5 or less.

Ester

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxy butyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

Cyclic Ester

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, ε-decanolactone, or a compound in which a hydrogen atom of a methylene group adjacent to a carbonyl group of one of the esters mentioned above is substituted by an alkyl group having 1 to 4 carbon atoms.

Alkylene Glycol Ether

As the alkylene glycol ether, a monoether or a diether of an alkylene glycol may be used, and an alkyl ether is preferable. As a particular example, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

The number of carbon atoms of an alkylene glycol forming the alkylene glycol ether is preferably 2 to 8, more preferably 2 to 6, even more preferably 2 to 4, and particularly preferably 2 or 3. The alkylene glycol forming the alkylene glycol ether may be a compound formed by intermolecular condensation between hydroxy groups of alkylene glycol molecules. The number of condensations between the alkylene glycols is preferably 1 to 4, more preferably 1 to 3, and further preferably 2 or 3.

An ether forming the alkylene glycol ether is preferably an alkyl ether, an ether of an alkyl having 1 to 4 carbon atoms is preferable, and an ether of an alkyl having 2 to 4 carbon atoms is more preferable.

Since having an excellent permeability and an excellent ink wettability to a recording medium, the alkylene glycol ether is preferable in terms of excellent image quality. From the point described above, a monoether is particularly preferable.

Nitrogen-Containing Solvent

As the nitrogen-containing solvent, for example, a non-cyclic amide or a cyclic amide may be mentioned. As the non-cyclic amide, an alkoxyalkylamide may be mentioned.

As the alkoxyalkylamide, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-prooxy-N,N-methylethylpropionamide, 3-iso-propoxy-N,N-dimethylpropionamide, 3-iso-propoxy-N,N-diethylpropionamide, 3-iso-prooxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

As the cyclic amide, a lactam may be mentioned, and for example, a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone, may be mentioned.

The organic solvent may be used alone, or at least two types thereof may be used in combination.

A weight average standard boiling point of the organic solvent contained in the ink jet ink composition according to this embodiment is preferably 160° C. to 260° C., more preferably 180° C. to 230° C., even more preferably 190° C. to 220° C., and further preferably 195° C. to 205° C. When the weight average standard boiling point of the organic solvent is in the range described above, the moisture retaining property and the drying property can be made more preferable at the same time with a good balance, and while a preferable clogging resistance is secured, the adhesion and the drying property tend to be further improved.

In addition, the weight average standard boiling point of the organic solvent contained in the ink composition indicates a weight average value of standard boiling points of individual organic solvents obtained based on the assumption that the ratios of mass contents of the organic solvents with respect to the total mass of all the organic solvents are regarded as the weights thereof.

A calculation method of a weight average standard boiling point of organic solvents contained in an ink composition is performed as described below. A weight average standard boiling point of organic solvents contained in an ink composition, a standard boiling point of each organic solvent, and a mass ratio thereof are represented by $H_{ALL}$, $H_N$, and $Y_N$ (percent by mass), respectively. In accordance with the types of organic solvents contained in the ink composition, N is represented by 1, 2, and so on in this order. For example, when three types of organic solvents are used, the standard boiling points thereof are represented by $H_1$, $H_2$, and $H_3$. The weight average value $H_{ALL}$ of the standard boiling points of the organic solvents contained in the ink composition is the sum of the products each of which is obtained from the standard boiling point $H_N$ and the mass ratio $Y_N$ of each organic solvent. Hence, the following equation (A) is satisfied. The mass ratio $Y_N$ is a ratio of the mass of an organic solvent N with respect to the total mass of all the organic solvents contained in the ink composition and is a value from 0 to 1.

$$H_{ALL} = \Sigma H_N \times Y_N \quad (A)$$

The weight average standard boiling point can be adjusted by the standard boiling point of an organic solvent to be used and a mass content ratio thereof.

A total content of the organic solvent with respect to the total mass of the ink composition is preferably 30 percent by mass or less, more preferably 27 percent by mass or less, and further preferably 25 percent by mass or less. On the other hand, although not particularly limited, a lower limit of the total content of the organic solvent is preferably 10 percent by mass or more, more preferably 13 percent by mass or more and further preferably 15 percent by mass or more. When the total content of the organic solvent with respect to the total mass of the ink composition is in the range described above, the moisture retaining property and the drying property can be more preferable at the same time with a good balance, and the clogging resistance, the adhesion, and the drying property tend to be made more preferable at the same time.

In the ink jet ink composition according to this embodiment, a polyol having a standard boiling point of more than 280° C., which functions as the organic solvent, is not contained preferably at a content of more than 1 percent by mass, more preferably at a content of more than 0.5 percent by mass, further preferably at a content of more than 0.1 percent by mass, and particularly preferably at a content of more than 0.05 percent by mass with respect to the total mass of the ink composition. A lower limit of the polyol having a standard boiling point of more than 280° C., which functions as the organic solvent, is 0 percent by mass.

Although having an excellent moisture retaining property, the polyol having a standard boiling point of more than 280° C., which functions as the organic solvent, may degrade the drying property of the ink in some cases when the ink is adhered to a recording medium. However, when the content thereof is in the range described above, the moisture retaining property and the drying property can be made more preferable at the same time with a good balance, and the clogging resistance, the adhesion, and the drying property tend to be made more preferable at the same time.

In addition, the polyol includes an alkanediol and a polyvalent alcohol as described above. As an alkanediol having a standard boiling point of more than 280° C., for example, 1,2-dodecandiol or triethylene glycol may be mentioned, and as a polyvalent alcohol having a standard boiling point of more than 280° C., for example, glycerin may be mentioned.

A content of the organic solvent having a standard boiling point of more than 280° C. is also preferably set in the range described above.

1.5. Water

The ink jet ink composition according to this embodiment is a water-based ink and is a composition containing water as a primary solvent.

The water is not particularly limited, and for example, pure water, such as ion exchange water, ultrafiltration water, reverse osmosis water, or distilled water or water, such as ultrapure water, in which ionic impurities are removed as much as possible may be mentioned. In addition, when water sterilized by ultraviolet radiation, addition of hydrogen peroxide, or the like is used, generation of fungi and/or bacteria can be prevented when the water-based ink composition is stored for a long time. As a result, the storage stability tends to be further improved.

A content of the water with respect to the total mass of the ink composition is preferably 30.0 percent by mass or more, more preferably 40.0 to 90.0 percent by mass, even more preferably 40.0 to 85.0 percent by mass, and further preferably 50.0 to 80.0 percent by mass.

1.6. Wax

In order to improve an abrasion resistance, the ink jet ink composition according to this embodiment may contain a wax. The wax is not particularly limited, and for example, a hydrocarbon wax or an ester wax which is a condensate between a fatty acid and a monovalent or a divalent alcohol may be mentioned. The hydrocarbon wax is not particularly limited, and for example, a paraffin wax or a polyolefin wax, such as a polyethylene wax or a polypropylene wax, may be mentioned. Those waxes may be used alone, or at least two types thereof may be used in combination.

As a commercially available product of a paraffin wax, for example, AQUACER497 or AQUACER539 (trade name, manufactured by BYK) may be mentioned.

As a commercially available product of a polyolefin wax, for example, Chemipearl S120, S650, or S75N (trade name, manufactured by Mitsui Chemicals Inc.) or AQUACER501, AQUACER506, AQUACER513, AQUACER515, AQUACER526, AQUACER593, or AQUACER582 (trade name, manufactured by BYK) may be mentioned.

A melting point of the wax is preferably 50° C. to 200° C., more preferably 60° C. to 180° C., and further preferably 70° C. to 180° C.

The wax is preferably added, for example, in the form of wax particles contained in a water-based emulsion in which a wax is dispersed in water. The wax particles may contain, for example, a surfactant to be used for dispersion.

A content of the wax with respect to the total mass of the ink composition is preferably 0.1 to 5.0 percent by mass, more preferably 0.3 to 4.0 percent by mass, and further preferably 0.5 to 3.0 percent by mass. Since the content of the wax is in the range described above, the adhesion of the recorded matter may be further improved in some cases.

1.7. Others

As other components, the ink jet ink composition according to this embodiment may contain various additives, such as a pH adjuster (such as potassium hydroxide, triethanolamine, or isopropanolamine), a solubilizing agent, a viscosity adjuster, an antioxidant, a fungicide/antiseptic agent, an antifungal agent, a corrosion inhibitor, and/or a chelating agent (such as sodium ethylenediaminetetraacetate) to trap metal ions having influence on dispersion.

1.8. Manufacturing Method and Physical Properties of Ink Jet Ink Composition

Manufacturing Method

The ink jet ink composition according to this embodiment can be obtained such that after the components (materials) described above are mixed together in an arbitrary order, for example, if needed, filtration is performed to remove impurities. In this case, when the ink contains a pigment as the colorant, since being easily handled, the pigment is preferably first prepared in a uniformly dispersed state in a solvent and is then mixed. When the pigment is prepared in a uniformly dispersed state in advance, a dispersant such as a dispersion resin is preferably used for the dispersion.

As a mixing method of the materials, a method in which the materials are sequentially added into a container equipped with a stirring device, such as a mechanical stirrer or a magnetic stirrer, and are then stirred and mixed together is preferably used. As a filtration method, for example, if needed, a centrifugal filtration or a filter filtration may be performed.

Physical Properties

A surface tension of the ink composition at 25° C. is preferably 20 to 50 mN/m and more preferably 20 to 40 mN/m. Since the surface tension is in the range described above, the ejection stability tends to be made preferable. In addition, the surface tension may be measured at a liquid temperature of 25° C. by Wilhelmy method using a surface tension meter (such as surface tensiometer CBVP-Z, manufactured by Kyowa Interface Science Co., Ltd.).

A viscosity of the ink composition at 25° C. is preferably 20 mPa·s or less and more preferably 10 mPa·s or less. Since the viscosity is in the range described above, the ejection stability tends to be made preferable. In addition, the viscosity may be measured by a viscometer.

1.9. Application

In recording using the ink jet ink composition according to this embodiment, a recording medium to form an image is not particularly limited. Hence, as the recording medium, an absorbing recording medium, such as paper, a film, or a cloth, a low-absorbing recording medium such as printing paper, or a non-absorbing recording medium, such as a metal, a glass, or a high molecular weight material, may be mentioned.

However, an excellent effect of the ink jet ink composition according to this embodiment is more significant when a low-absorbing recording medium or a non-absorbing recording medium is used. That is, since the ink is not likely to be dried on a low-absorbing recording medium or a non-absorbing recording medium as compared to on an absorbing recording medium, the adhesion and the drying property are liable to be degraded; however, by the ink jet ink composition according to this embodiment, even if the recording medium as described above is used, the clogging resistance, the adhesion, and the drying property can be made preferable at the same time. Hence, the ink jet ink composition according to this embodiment is preferably used for recording on a low-absorbing recording medium or a non-absorbing recording medium.

The low-absorbing recording medium or the non-absorbing recording medium indicates a recording medium hardly absorbing a liquid, such as an ink composition, or a recording medium absorbing no liquid, respectively. From a quantitative point of view, the low-absorbing recording medium or the non-absorbing recording medium indicates a recording medium having a water absorbing amount of 10 mL/m$^2$ or less from a contact start to a point of 30 msec$^{1/2}$ by Bristow method. This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the absorbing recording medium indicates a recording medium having neither a non-absorbing property nor a low-absorbing property.

As the non-absorbing recording medium, a recording medium having a recording surface formed of a plastic may be mentioned. In addition, the recording surface includes neither an absorbing layer nor a receiving layer to absorb an ink. For example, there may be mentioned a recording medium in which a plastic is coated on a substrate such as paper, a recording medium in which a plastic film is adhered to a substrate such as paper, or a plastic film having neither an absorbing layer nor a receiving layer. The plastic described above indicates, for example, a poly(vinyl chloride), a poly(ethylene terephthalate), a polycarbonate, a polystyrene, a polyurethane, a polyethylene, or a polypropylene.

In addition, as the low-absorbing recording medium, a recording medium, so-called coated paper, having a coated layer as a surface layer may be mentioned. For example, as a recording medium using paper as a substrate, printing paper, such as art paper, coated paper, or matte paper, may be mentioned. When the substrate is a plastic film, there may be mentioned a recording medium in which a hydrophilic polymer or the like is coated on a surface of a poly(vinyl chloride), a poly(ethylene terephthalate), a polycarbonate, a polystyrene, a polyurethane, a polyethylene, a polypropylene, or the like or a recording medium in which particles of silica, titanium, or the like are coated with a binder on the surface mentioned above.

The ink jet ink composition according to this embodiment may also be preferably used for recording on a flexible package film. The flexible package film is one type of the non-absorbing recording medium described above. In more particular, the flexible package film is a highly flexible film material which is used, for example, for food package and package of toiletry and cosmetics, which has an anti-fog property and an antistatic property, which contains an antioxidant or the like in its film surface, and which has a thickness of 5 to 70 μm and preferably 10 to 50 μm. When being adhered to the film described above, an ink composition is more unlikely to be fixed thereto as compared to the case in which a plastic film having an ordinary thickness is used, and even if being fixed, the ink composition is not likely to appropriately correspond and conform to the flexibility of the film, and as a result, peeling of the ink is liable to occur. However, the ink jet ink composition according to this embodiment also tends to have an excellent adhesion to the flexible package film.

As a material forming a recording surface of the flexible package film, a material containing at least one selected from an olefin-based resin, such as a polyethylene or a polypropylene, an ester-based resin such as a polyester, a vinyl chloride-based resin such as a poly(vinyl chloride), and an amide-based resin such as a polyamide may be used. As a film substrate including the recording surface of the flexible package film, those resins mentioned above each may be used after being processed into a film shape or a sheet shape. In the case of a film or a sheet formed from the resin, a non-stretched film or a stretched film stretched in one axial direction or biaxial directions may be used, and a film stretched in biaxial directions is preferably used. In addition, if needed, films or sheets formed from those various types of resins mentioned above may be used in a laminated state after being adhered to each other.

In addition, the ink jet ink composition according to this embodiment may also be preferably used for recording on a sign graphic recording medium. As the sign graphic recording medium, for example, many various types of materials, such as a banner, coated paper, matte paper, wallpaper, a cloth, and a plastic film, such as a PET or a PVC film, have been widely used, and in particular, the ink jet ink composition according to this embodiment may be preferably used on a transparent or a semi-transparent plastic film to be used for a window display, a car wrapping, or the like. Those films described above each have a substrate formed from a polyolefin, a PET, a PVC, or the like having flexibility and are frequently used after an adhesive layer is provided on a surface of the substrate opposite to a recording surface thereof, and after the printing is performed, the films are each adhered to a window glass, a car body, or the like with an adhesive surface. When being adhered to this film, an ink is more unlikely to be fixed thereto, and even if being fixed, the ink is not likely to appropriately correspond and conform to the flexibility of this film, so that peeling is liable to occur. However, the ink jet ink composition according to this embodiment also tends to have an excellent adhesion to a sign graphic film.

As a material forming a recording surface of the sign graphic film, for example, a material containing at least one selected from an olefin-based resin, such as a polyethylene or a polypropylene, an ester-based resin such as a polyester, a vinyl chloride-based resin such as a poly(vinyl chloride), and an amide-based resin such as a polyamide, may be used.

In addition, for example, the recording medium may be colorless and transparent, semi-transparent, colored transparent, colored opaque, or colorless and opaque.

2. RECORDING METHOD

A recording method according to an embodiment of the present disclosure includes a step of ejecting the ink jet ink composition described above by an ink jet method so as to be adhered to a recording medium.

According to the structure described above, a recording method in which ink conformability to a recording medium is excellent, and the clogging resistance and the adhesion are also excellent can be provided.

In a recording method in which an ink containing a silicone-based surfactant having a predetermined HLB value or less and an acrylic-based resin having a glass transition temperature in a predetermined range is used, although the conformability to a recording medium is excellent, when the ink is dried, a fixing resin is liable to be welded in a recording head, and as a result, a clogging problem may arise. However, in order to prevent the clogging caused by this drying, when a content of an organic solvent functioning as a moisturizing agent is increased, and/or when an organic solvent having a high moisture retaining property is contained, the drying property of the ink is degraded, and as a result, the adhesion is degraded. As described above, in the past, the clogging resistance and the adhesion are difficult to obtain at the same time.

Through intensive research carried out by the present inventor, it was found that by using an ink containing a 1,2-alkanediol having 4 carbon atoms or less and an alkanediol having diols at both terminals and 3 to 5 carbon atoms in combination in a recording method, the clogging resistance and the adhesion can be obtained at the same time. That is, since a 1,2-alkanediol having 4 carbon atoms or less which has an excellent drying property but has not a sufficient moisture retaining property so as to prevent a silicone-based surfactant having a relatively low HLB value from dissolving or swelling an acrylic-based fixing resin and an alkanediol having diols at both terminals and 3 to 5 carbon atoms which has an excellent moisture retaining property and which can secure a sufficient drying property are used in combination, the clogging resistance and the adhesion can be obtained at the same time.

Hereinafter, an ink jet recording apparatus which can be used for the recording method according to this embodiment will be described, and individual steps of the recording method according to this embodiment will be described.

2.1. Ink Jet Recording Apparatus

One example of an ink jet recording apparatus which can be preferably used for the individual steps of the recording method according to this embodiment will be described with reference to the drawings.

2.1.1. Outline of Apparatus

Figure 2:
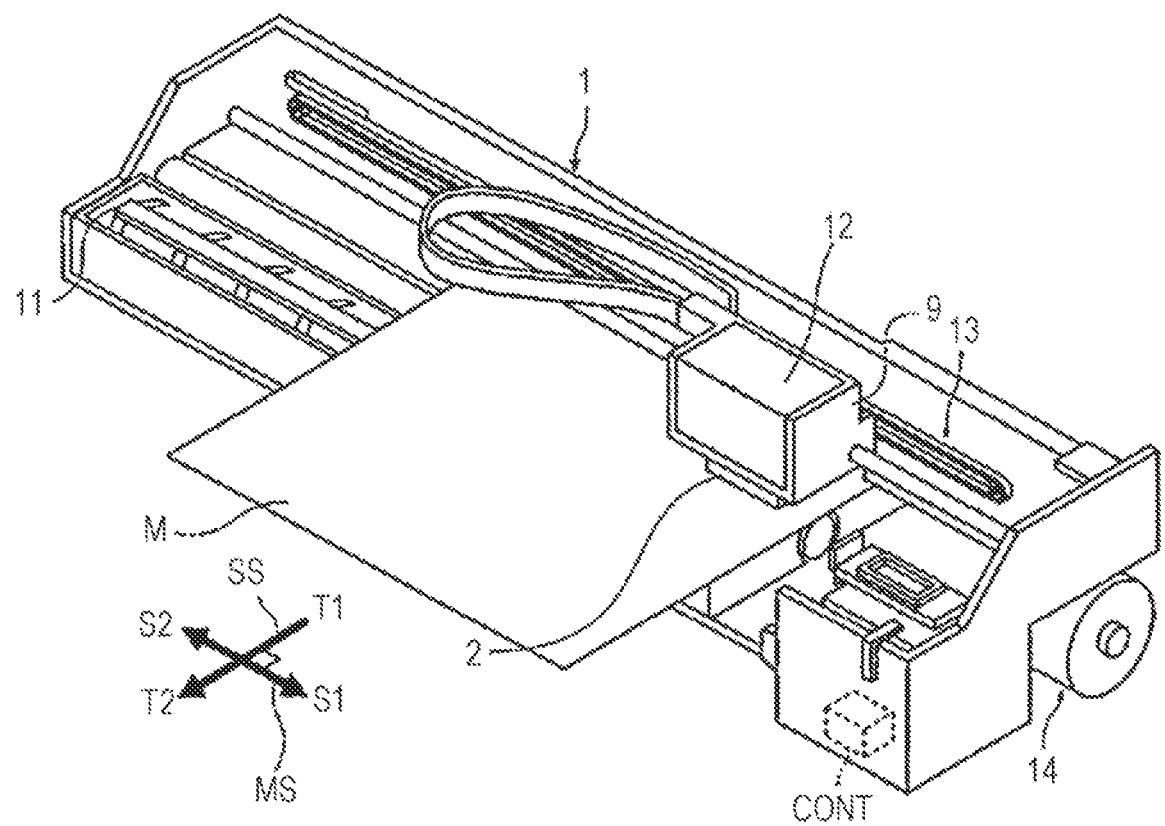
FIG. 2 is a schematic view of a carriage and its vicinity of the example of the ink jet recording apparatus.

FIG. 1 is a cross-sectional view schematically showing an ink jet recording apparatus 1. FIG. 2 is a perspective view showing one example of the structure of a carriage and its vicinity of the ink jet recording apparatus 1 shown in FIG. 1. As shown in FIGS. 1 and 2, the ink jet recording apparatus 1 includes a recording head 2, an IR heater 3, a platen heater 4, a heating heater 5, a cooling fan 6, a pre-heater 7, a ventilation fan 8, a carriage 9, a platen 11, a carriage transfer mechanism 13, a transport device 14, and a control portion CONT. In the ink jet recording apparatus 1, all operations thereof are controlled by the control portion CONT shown in FIG. 2.

2.1.2. Structure of Recording Head

The recording head 2 has a structure to perform recording on a recording medium M by ejecting an ink jet ink composition from nozzles of the recording head 2 so as to be adhered thereto. As shown in FIGS. 1 and 2, the recording head 2 is a serial type recording head and adheres the ink to the recording medium M by a plurality of scannings in a main scanning direction relative to the recording medium M. The recording head 2 is mounted on the carriage 9 shown in FIG. 2. The recording head 2 is scanned a plurality of times in the main scanning direction relative to the recording medium M by the operation of the carriage transfer mechanism 13 to transfer the carriage 9 in a medium width direction of the recording medium M. The medium width direction is the main scanning direction of the recording head 2. The scanning in the main scanning direction is also called a main scanning.

In addition, the main scanning direction is a direction in which the carriage 9 mounting the recording head 2 is transferred. In FIG. 1, the main scanning direction is a direction intersecting a sub-scanning direction which is a transport direction of the recording medium M shown by an arrow SS. In FIG. 2, the width direction of the recording medium M, that is, a direction represented by S1-S2, is a main scanning direction MS, and a direction represented by T1→T2 is a sub-scanning direction SS. In addition, by one scanning, the scanning is performed in the main scanning direction, that is, in one direction represented by an arrow S1 or an arrow S2. In addition, since the main scanning of the recording head 2 and the sub-scanning which is the transport of the recording medium M are repeatedly performed at least two times, the ink is recorded on the recording medium M.

The cartridge 12 to supply the ink to the recording head 2 includes a plurality of independent cartridges. The cartridge 12 is detachably fitted to the carriage 9 mounting the recording head 2. In the cartridges, different types of ink jet ink compositions may be filled, and the ink jet ink compositions are supplied to respective nozzles from the cartridge 12. In addition, in FIGS. 1 and 2, although the case in which the cartridge 12 is fitted to the carriage 9 is shown by way of example, the cartridge 12 is not limited thereto and may be provided at a position other than the carriage 9 so that the ink jet ink compositions are supplied to the respective nozzles by supply tubes not shown.

For the ejection from the recording head 2, a known method may be used. In this embodiment, a method to eject a liquid droplet using vibration of a piezoelectric element, that is, an ejection method to form an ink droplet by a mechanical deformation of a piezoelectric element, is used.

2.1.3. Primary Heating Mechanism

The ink jet recording apparatus 1 may include a primary heating mechanism to heat the recording medium M when the ink is ejected from the recording head 2 and is adhered to the recording medium. As the primary heating mechanism, for example, a conduction method, a ventilation method, or a radiation method may be used. The conduction method conducts heat to a recording medium from a member in contact therewith. For example, a platen heater may be mentioned. The ventilation method dries an ink or the like by sending an ordinary temperature wind or a hot wind to a recording medium. For example, a ventilation fan may be mentioned. The radiation method heats a recording medium by emitting radiation rays generating heat thereto. For example, an IR radiation may be mentioned. In addition, although not shown in the drawing, a heater similar to the platen heater 4 may also be provided right downstream thereof in a SS direction. Those primary heating mechanisms mentioned above may be used alone, or at least two methods thereof may be used in combination. For example, as the primary heating mechanism, the IR heater 3 and the platen heater 4 may be provided.

In addition, when the IR heater 3 is used, by radiation of infrared rays from a recording head 2 side, the recording medium M can be heated by a radiation method. Accordingly, although the recording head 2 is also liable to be simultaneously heated, compared to the case in which heating is performed from a rear surface of the recording medium M by the platen heater 4 or the like, the temperature can be increased without receiving the influence of the thickness of the recording medium M. In addition, various types of fans (such as the ventilation fan 8) may also be provided to dry the ink on the recording medium M by supplying a hot wind or a wind having the same temperature as that in the environment to the recording medium M.

The platen heater 4 is able to heat the recording medium M at a position facing the recording head 2 with the platen 11 interposed therebetween. The platen heater 4 is able to heat the recording medium M by a conduction method and may be used if needed in the recording method.

The ink jet recording apparatus 1 may also include the pre-heater 7 to heat the recording medium M in advance before the ink is adhered to the recording medium M.

2.1.4. Post-Heating Mechanism

There may also be provided a post-heating mechanism which is located downstream of the primary heating mechanism and which completes the recording by sufficient drying so that the recorded matter can be used.

The heating heater 5 used in the post-heating mechanism functions to dry and solidify the ink adhered to the recording medium M. Since the heating heater 5 heats the recording medium M on which an image is recorded, moisture and the like contained in the ink are rapidly evaporated and/or scattered, and hence, an ink film is formed by a resin contained in the ink. As described above, the ink film is tightly fixed or adhered onto the recording medium M, that is, an excellent film forming property is obtained, and hence, an image having an excellent high image quality can be obtained in a short time.

2.1.5. Other Structures

The ink jet recording apparatus 1 may also include the cooling fan 6. After the ink recorded on the recording medium M is dried, since the ink on the recording medium M is cooled by the cooling fan 6, an ink coating film which is tightly adhered to the recording medium M can be formed.

At a lower side of the carriage 9, the platen 11 to support the recording medium M, the carriage transfer mechanism 13 to transfer the carriage 9 relative to the recording medium M, and the transport device 14 in the form of a roller to transport the recording medium M in the sub-scanning direction are provided. Operations of the carriage transfer mechanism 13 and the transport device 14 are controlled by the control portion CONT.

2.1.6. Electric Control

Figure 3:
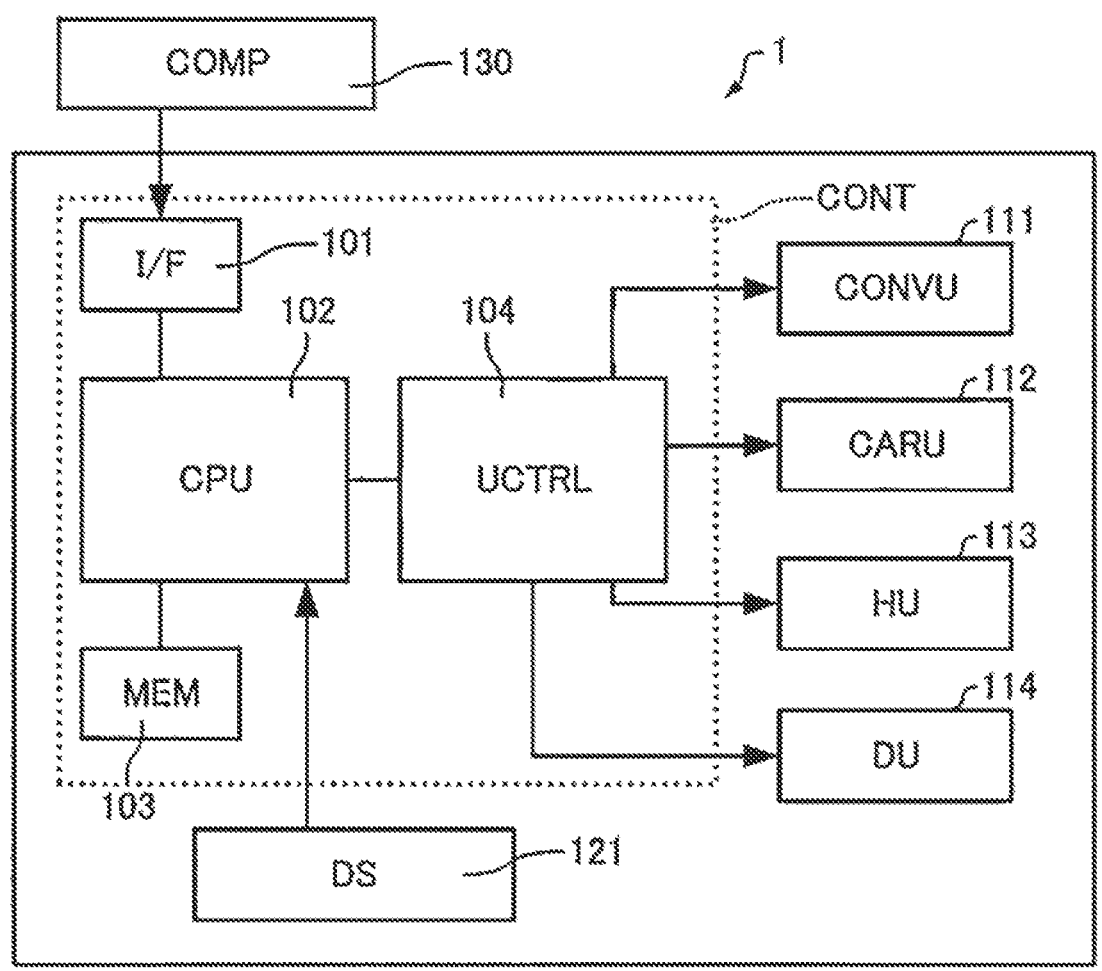
FIG. 3 is a block diagram of the example of the ink jet recording apparatus.

FIG. 3 is a functional block diagram of the ink jet recording apparatus 1. The control portion CONT is a control unit to control the ink jet recording apparatus 1. An interface portion 101 (I/F) functions to send and receive data between a computer 130 (COMP) and the ink jet recording apparatus 1. A CPU 102 is an arithmetic processing device to control the entire ink jet recording apparatus 1. A memory 103 (MEM) is to secure, for example, a region in which a program of the CPU 102 is stored and an operation region thereof. The CPU 102 controls individual units by a unit control circuit 104 (UCTRL). In addition, the status in the ink jet recording apparatus 1 is monitored by a detector group 121 (DS), and based on the detection result thereof, the control portion CONT controls the individual units.

A transport unit 111 (CONVU) controls the sub-scanning (transport) of the ink jet recording and in particular, controls a transport direction and a transport rate of the recording medium M. In more particular, by controlling a rotation direction and a rotation rate of a transport roller driven by a motor, the transport direction and the transport rate of the recording medium M are controlled.

A carriage unit 112 (CARU) controls the main scanning (pass) of the ink jet recording and in particular, reciprocally transfers the recording head 2 in the main scanning direction. The carriage unit 112 includes the carriage 9 mounting the recording head 2 and the carriage transfer mechanism 13 to reciprocally transfer the carriage 9.

A head unit 113 (HU) controls an ejection amount of the ink from a nozzle of the recording head 2. For example, when the nozzle of the recording head 2 is driven by a piezoelectric element, the operation of the piezoelectric element of each nozzle is controlled. By the head unit 113, for example, a timing of each ink adhesion and a dot size of the ink are controlled. In addition, by combination of controls of the carriage unit 112 and the head unit 113, an adhesion amount of the ink per one scanning is controlled.

A drying unit 114 (DU) controls the temperatures of various types of heaters, such as the IR heater 3, the pre-heater 7, the platen heater 4, and the heating heater 5.

In the ink jet recording apparatus 1 described above, an operation in which the carriage 9 mounting the recording head 2 is transferred in the main scanning direction and a transport operation (sub-scanning) are alternately repeated. In this step, when each pass is performed, the control portion CONT controls the carriage unit 112 to transfer the recording head 2 in the main scanning direction and also controls the head unit 113 to eject a liquid droplet of the ink from a predetermined nozzle hole of the recording head 2 so as to adhere the liquid droplet of the ink to the recording medium M. In addition, the control portion CONT controls the transport unit 111 so that in the transport operation, the recording medium M is transported by a predetermined transport amount (feed amount) in the transport direction.

In the ink jet recording apparatus 1, since the main scanning (pass) and the sub-scanning (transport operation) are repeatedly performed, a recording region to which liquid droplets are adhered is gradually transported. Subsequently, by the heating heater 5, the liquid droplets adhered to the recording medium M are dried, so that an image is completed. Next, the recorded matter thus completed may be wound into a roll shape by a winding mechanism or may be transported by a flatbed mechanism.

Hereinafter, the individual steps of the recording method according to this embodiment will be described.

2.2. Ink Adhesion Step

The recording method according to this embodiment includes a step (ink adhesion step) to eject the ink jet ink composition described above by an ink jet method so as to be adhered to a recording medium. In addition, the "ink jet method" is a method to eject a liquid droplet using an ink jet head.

An adhesion amount of the ink which is defined as an adhesion mass of the ink composition per unit area of a recording region of a recording medium is preferably 3 mg/inch$^2$ or more, more preferably 5 mg/inch$^2$ or more, further preferably 7 mg/inch$^2$ or more. In addition, an upper limit of the ink adhesion amount is preferably 15 mg/inch$^2$ or less, more preferably 12 mg/inch$^2$ or less, and further preferably 9 mg/inch$^2$ or less. By the recording method according to this embodiment, when the ink adhesion amount is in the range described above, the conformability is excellent, and the clogging resistance and the adhesion tend to be improved.

The maximum adhesion amount of the ink composition per unit area of the recording region of the recording medium in the recording is also preferably set in the range describe above.

The recording medium is similar to a recording medium which can be used for the ink jet ink composition described above, and a low-absorbing recording medium or a non-absorbing recording medium is preferable. Since the ink is not likely to be dried on a low-absorbing recording medium or a non-absorbing recording medium as compared to on an absorbing recording medium, the adhesion and the drying property of the ink are liable to be degraded; however, by the recording method according to this embodiment, even if the recording medium as described above is used, the clogging resistance, the adhesion, and the drying property can be made preferable at the same time.

In addition, in the recording method according to this embodiment, the recording is performed by a plurality of main scannings, and the number of main scannings performed on the same scanning region is preferably 10 times or less, more preferably 9 times or less, even more preferably 7 times or less, further preferably 5 times or less, and particularly preferably 4 times or less. Although the number of main scannings is at least one time, and a lower limit thereof is not particularly limited, the number of main scannings is preferably at least 3 times or more.

In the case in which a resolution which is the number of dots (number of ink droplets) per unit area is fixed, when the number of main scannings is small, since the number of dots to be simultaneously ejected is increased, the ink droplets tend to be gathered together, and as a result, the conformability tends to be degraded. In a recording method using an ink containing a silicone-based surfactant having a predetermined HLB value or less, although the conformability to a recording medium may be improved in some cases, the clogging is liable to occur; hence in order to overcome the clogging, the adhesion is also required to be overcome at the same time. In addition, when the number of main scannings is small, since a drying time in the primary heating step which will be described below is shortened, the drying is liable to be insufficient, and the adhesion tends to be degraded. In addition, when the number of main scannings is small, a recording rate is fast, and a time in which the same portion of the recording medium stays in the post-heating mechanism may also be shortened in some cases.

However, by the recording method according to this embodiment, even when the number of main scannings is small, a preferable conformability can be secured, and in addition, the clogging resistance and the adhesion tend to be made preferable at the same time.

In addition, the number of main scannings performed on the same scanning region indicates a total number of main scannings in the case in which after one main scanning is performed in a scanning region on a recording medium by a recording head, a main scanning is again performed so as to be overlapped with at least a part of the scanning region described above. For example, when a distance by one sub-scanning is shorter than a sub-scanning direction length of a nozzle line to eject the ink, a scanning is again performed on the scanning region scanned by one main scanning. For example, when the distance by one sub-scanning is one eighth of the sub-scanning direction length of the nozzle line to eject the ink, the main scanning is performed 8 times on the same scanning region. In the case described above, the number of main scannings is regarded as 8 times.

2.3. Primary Heating Step

The recording method according to this embodiment includes a primary heating step to heat the above ink jet ink composition adhered to a recording medium, and a surface temperature of the recording medium in the primary heating step is preferably 40° C. or more.

In addition, the surface temperature of the recording medium in the primary heating step is preferably 50° C. or less, more preferably 47° C. or less, even more preferably 45° C. or less, and particularly preferably 43° C. or less. In addition, the surface temperature of the recording medium in the primary heating step is preferably 28° C. or more, more preferably 33° C. or more, even more preferably 38° C. or more, and particularly preferably 45° C. or more.

Since being more excellent in drying property, the recording method having the structure as described above is able to further improve the adhesion of the recorded matter. On the other hand, the wet-spreadability of an ink on a recording medium tends to be degraded, and the conformability is liable to be degraded. Hence, in order to improve the conformability, when an ink containing a silicone-based surfactant having a predetermined HLB value or less is used, the clogging is liable to occur; hence, in order to overcome the clogging, the adhesion is also required to be overcome at the same time. However, by the recording method according to this embodiment, even if the structure as described above is provided, a preferable conformability can be secured, and in addition, the clogging resistance and the adhesion tend to be made preferable at the same time.

The primary heating step is a step to heat and dry the ink adhered to the recording medium at an early stage. The primary heating step is a heating step to dry at least a part of a solvent component of the ink so as to at least decrease the fluidity of the ink adhered to the recording medium. The primary heating step may be performed so that the ink is adhered to a heated recording medium or so that the ink is heated at an early stage after the ink adhesion. Heating in the primary heating step is preferably started within 0.5 seconds at the latest after an ink droplet lands on the recording medium.

The primary heating step is preferably performed by an IR heater, radiation of microwaves, a platen heater, or a hot wind blown to the recording medium by a fan.

The heating in the primary heating step may be performed before the ink adhesion step described above, at the same time as the ink adhesion, or at an early stage after the ink adhesion and is preferably performed at the same time as the ink adhesion. By the heating order as described above, the ink adhesion step can be performed.

In addition, in the case in which the ink is adhered to a heated recording medium, the heating temperature in the primary heating step is a surface temperature of the recording medium at the ink adhesion, and in the case in which the heating is performed at an early stage after the ink adhesion, the heating temperature in the primary heating step is a surface temperature of the recording medium when the heating is performed. In addition, the heating temperature is the maximum temperature during the heating in the primary heating step.

2.4. Post-Heating Step

The recording method according to this embodiment preferably includes a post-heating step to heat the recording medium to which the ink jet ink composition described above is adhered. By this post-heating step, the drying property is further improved, and a recorded matter having a more excellent adhesion preferably tends to be obtained.

The post-heating step is a heating step to sufficiently perform heating so as to complete the recording and so that the recorded matter can be used. The post-heating step is a heating step to sufficiently dry the solvent component of the ink and to heat the resin contained in the ink so as to flatten a coating film of the ink. The post-heating step is preferably started more than 0.5 seconds after the ink is adhered to the recording medium. For example, the heating is preferably started to the region described above more then 0.5 seconds after the ink adhesion is all completed to the recording region of the recording medium. In addition, a preferable temperature in the primary heating step described above is preferably different from a preferable temperature in the post-heating step.

For example, when the ink jet recording apparatus is used, the heating of the recording medium in the post-heating step may be performed by an appropriate heating device. In addition, besides the heating device equipped in the ink jet recording apparatus, the heating may be performed by an appropriate heating device.

In addition, a surface temperature of the recording medium in this case is preferably 60° C. or more, more preferably 70° C. or more, even more preferably 80° C. or more, and further preferably 85° C. or more. In addition, a surface temperature of the recording medium heated in the post-heating step is preferably 120° C. or less, more preferably 110° C. or less, even more preferably 100° C. or less, and further preferably 95° C. or less. By the recording method according to this embodiment, even when the surface temperature of the recording medium is in the range described above, the ink can be sufficiently dried, and a recorded matter excellent in adhesion tends to be obtained.

3. EXAMPLES

Hereinafter, although the present disclosure will be described in more detail with reference to Examples, the present disclosure is not limited thereto. Hereinafter, "%" is on a mass basis unless otherwise particularly noted.

3.1. Preparation of Ink Jet Ink Composition

After individual components were mixed together at contents shown in the following Table 1 and Table 2 and were then stirred at room temperature for 2 hours, filtration was performed using a membrane filter having a pore diameter of 5 μm, so that each ink jet ink composition was obtained. In addition, the units of the contents of the compositions shown in the following Table 1 and Table 2 are each percent by mass, and water was added so that the total mass of the composition was 100 percent by mass. In addition, in the following Table 1 and Table 2, the content of the pigment was a pigment solid content, and the content of the acrylic-based resin is a resin solid content.

3.1.1. Preparation of Pigment Dispersion

A black pigment (C.I. Pigment Black 7) used for preparation of the ink jet ink composition and a pigment dispersant (not shown in the table) which was a water-soluble styrene acrylic-based resin were mixed in advance at a mass ratio of 1:1 (pigment:pigment dispersant) in water, and stirring was sufficiently performed, so that a pigment dispersion was obtained.

3.1.2. Synthetic Method of Resin

Preparation Example of Synthetic Resin 1

In a reaction chamber equipped with a dripping device, a thermometer, a water-cooling type reflux condenser, and a stirrer, 100 parts by mass of ion exchange water, 0.4 parts by mass of potassium persulfate functioning as a polymerization initiator, and 0.25 parts by mass of sodium lauryl sulfate were charged and then heated to 70° C.

In the reaction chamber described above, a mixture obtained by mixing 144 parts by mass of monomers at the following mass ratios, 67 parts by mass of ion exchange water, and 0.52 parts by mass of t-dodecyl mercaptan was dripped with stirring in a nitrogen atmosphere to perform a polymerization reaction.

Monomer
  Styrene 40 parts
  Methyl methacrylate 2 parts
  Acrylic acid 15 parts
  Methyl acrylate 15 parts
  2-hydroxyethyl acrylate 2 parts
  Ethyl acrylate 8 parts
  2-ethylhexyl acrylate 18 parts After the polymerization reaction was performed, a pH of 8 to 8.5 was adjusted by neutralization with sodium hydroxide, and filtration was performed using a 0.3-μm filter, so that a resin was obtained. In addition, the resin thus obtained was in a dispersed state.

A differential scanning calorimetry measurement (DSC) in accordance with JIS K7121 was performed on the resin thus obtained, and a glass transition temperature Tg (° C.) of the polymer was obtained. As a differential scanning calorimeter, model "DSC6220" manufactured by Seiko Electronics Corporation was used. In addition, when the measured glass transition temperature of the resin thus obtained had an error from the value shown in the following Table 1 and Table 2, polymerization was again performed by fine adjustment of the mass ratios of the individual monomers, so that the glass transition temperature was set as shown in the following Table 1 and Table 2.

Preparation Examples of Synthetic Resin 2 and Synthetic Resin 3

Except for that the glass transition temperature was set to one of the values shown in the following Table 1 and Table 2 by finely adjusting the mass ratios of the individual monomers of the monomer composition of the above synthetic resin 1, a synthetic resin 2 and a synthetic resin 3 were obtained by polymerization using a method similar to that of the synthetic resin 1. In addition, the adjustment of the glass transition temperature was performed such that after a Tg of a homopolymer of each monomer was confirmed, when the Tg of the synthetic resin was increased, the mass ratio of a monomer having a high Tg was increased, and when the Tg of the synthetic resin was decreased, the mass ratio of a monomer having a low Tg was increased.

TABLE 1

| | | INFORMATION | INK 1 | INK 2 | INK 3 | INK 4 | INK 5 | INK 6 | INK 7 |
|---|---|---|---|---|---|---|---|---|---|
| PIGMENT | BLACK PIGMENT | | 4 | 4 | 4 | 4 | 4 | 4 | 4 |
| ACRYLIC-BASED RESIN | JONCRYL 62J | Tg = 85 | 1 | 1 | 1 | 1 | 1 | 1 | 1 |
| | SYNTHETIC RESIN 1 | Tg = 55 | | | | | | | |
| | SYNTHETIC RESIN 2 | Tg = 30 | | | | | | | |
| | SYNTHETIC RESIN 3 | Tg = 100 | | | | | | | |
| ORGANIC SOLVENT A | PROPYLENE GLYCOL | b.p. = 184 | 12 | 10 | 12 | 12 | 12 | 12 | 12 |
| | 1,2-BUTANEDIOL | b.p. = 194 | | | | | | | |
| ORGANIC SOLVENT B | 1,3-PROPANEDIOL | b.p. = 209 | 6 | 8 | | | 6 | 6 | 3 |
| | 1,4-BUTANEDIOL | b.p. = 230 | | | 6 | | | | 3 |
| | 1,5-PENTANEDIOL | b.p. = 238 | | | | 6 | | | |
| OTHER ORGANIC SOLVENTS | 1,6-HEXANEDIOL | b.p. = 250 | | | | | | | |
| | GLYCERIN | b.p. = 290 | | | | | | | |
| | HEXYLENE GLYCOL | b.p. = 197 | | | | | | | |
| | DIETHYLENE GLYCOL MONOETHYL ETHER | b.p. = 196 | | | | | | | |
| | 1,2-PENTANEDIOL | b.p. = 210 | | | | | | | |
| | 1,2-HEXANEDIOL | b.p. = 228 | | | | | | | |
| SURFACTANT | SILICON BASE | SAG503A HLB = 11 | 5 | 5 | 5 | 5 | 5 | 5 | 5 |
| | | KF-353 HLB = 10 | | | | | | 1 | |
| | | SAG005 HLB = 7 | 1 | 1 | 1 | 1 | | | 1 |
| | | Tego Wet 280 HLB = 3.5 | | | | | 1 | | |
| | ACETYLENE BASE | SURFYNOL 440 HLB = 8 | | | | | | | |
| WAX | AQ513 | | 0.5 | 0.5 | 0.5 | 0.5 | 0.5 | 0.5 | 0.5 |
| WATER | | | BAL-ANCE | BAL-ANCE | BAL-ANCE | BAL-ANCE | BAL-ANCE | BAL-ANCE | BAL-ANCE |
| TOTAL | | | 100 | 100 | 100 | 100 | 100 | 100 | 100 |
| TOTAL MASS OF ORGANIC SOLVENTS | | | 23 | 23 | 23 | 23 | 23 | 23 | 23 |
| AVERAGE BOILING POINT OF ORGANIC SOLVENTS (° C.) | | | 200 | 202 | 206 | 208 | 200 | 200 | 203 |
| ORGANIC SOLVENT B/ORGANIC SOLVENT A | | | 0.5 | 0.8 | 0.5 | 0.5 | 0.5 | 0.5 | 0.5 |

| | | INFORMATION | INK 8 | INK 9 | INK 10 | INK 11 | INK 12 | INK 13 |
|---|---|---|---|---|---|---|---|---|
| PIGMENT | BLACK PIGMENT | | 4 | 4 | 4 | 4 | 4 | 4 |
| ACRYLIC-BASED RESIN | JONCRYL 62J | Tg = 85 | 1 | 1 | 1 | 1 | | |
| | SYNTHETIC RESIN 1 | Tg = 55 | | | | | | |
| | SYNTHETIC RESIN 2 | Tg = 30 | | | | | 1 | |
| | SYNTHETIC RESIN 3 | Tg = 100 | | | | | | 1 |
| ORGANIC SOLVENT A | PROPYLENE GLYCOL | b.p. = 184 | 12 | 12 | 18 | 12 | 12 | 12 |
| | 1,2-BUTANEDIOL | b.p. = 194 | | | | | | |
| ORGANIC SOLVENT B | 1,3-PROPANEDIOL | b.p. = 209 | 6 | | | 6 | 6 | 6 |
| | 1,4-BUTANEDIOL | b.p. = 230 | | | | | | |
| | 1,5-PENTANEDIOL | b.p. = 238 | | | | | | |
| OTHER ORGANIC SOLVENTS | 1,6-HEXANEDIOL | b.p. = 250 | | 6 | | | | |
| | GLYCERIN | b.p. = 290 | | | | | | |
| | HEXYLENE GLYCOL | b.p. = 197 | | | | | | |
| | DIETHYLENE GLYCOL MONOETHYL ETHER | b.p. = 196 | | | | | | |

TABLE 1-continued

|  |  |  |  |  |  |  |  |  |  |
|---|---|---|---|---|---|---|---|---|---|
|  |  | 1,2-PENTANEDIOL |  | b.p. = 210 |  |  |  |  |  |
|  |  | 1,2-HEXANEDIOL |  | b.p. = 228 | 5 | 5 | 5 | 5 | 5 | 5 |
| SURFACTANT | SILICON BASE | SAG503A | HLB = 11 | 1 |  |  |  |  |  |
|  |  | KF-353 | HLB = 10 |  |  |  |  |  |  |
|  |  | SAG005 | HLB = 7 |  | 1 | 1 |  | 1 | 1 |
|  |  | Tego Wet 280 | HLB = 3.5 |  |  |  |  |  |  |
|  | ACETYLENE BASE | SURFYNOL 440 | HLB = 8 |  |  |  | 1 |  |  |
| WAX | AQ513 |  |  | 0.5 | 0.5 | 0.5 | 0.5 | 0.5 | 0.5 |
| WATER |  |  |  | BALANCE | BALANCE | BALANCE | BALANCE | BALANCE | BALANCE |
| TOTAL |  |  |  | 100 | 100 | 100 | 100 | 100 | 100 |
| TOTAL MASS OF ORGANIC SOLVENTS |  |  |  | 23 | 23 | 23 | 23 | 23 | 23 |
| AVERAGE BOILING POINT OF ORGANIC SOLVENTS (° C.) |  |  |  | 200 | 211 | 194 | 200 | 200 | 200 |
| ORGANIC SOLVENT B/ORGANIC SOLVENT A |  |  |  | 0.5 | 0.0 | 0.0 | 0.5 | 0.5 | 0.5 |

TABLE 2

|  |  | INFORMATION | INK 14 | INK 15 | INK 16 | INK 17 | INK 18 | INK 19 | INK 20 |
|---|---|---|---|---|---|---|---|---|---|
| PIGMENT | BLACK PIGMENT |  | 4 | 4 | 4 | 4 | 4 | 4 | 4 |
| ACRYLIC-BASED RESIN | JONCRYL 62J | Tg = 85 | 1 | 1 | 1 | 1 | 1 |  | 1 |
|  | SYNTHETIC RESIN 1 | Tg = 55 |  |  |  |  |  | 1 |  |
|  | SYNTHETIC RESIN 2 | Tg = 30 |  |  |  |  |  |  |  |
|  | SYNTHETIC RESIN 3 | Tg = 100 |  |  |  |  |  |  |  |
| ORGANIC SOLVENT A | PROPYLENE GLYCOL | b.p. = 184 | 10 | 6 | 15 | 15 |  | 12 | 9 |
|  | 1,2-BUTANEDIOL | b.p. = 194 |  |  |  |  | 12 |  |  |
| ORGANIC SOLVENT B | 1,3-PROPANEDIOL | b.p. = 209 | 5 | 12 | 2 | 7 | 6 | 6 | 4 |
|  | 1,4-BUTANEDIOL | b.p. = 230 |  |  |  |  |  |  |  |
|  | 1,5-PENTANEDIOL | b.p. = 238 |  |  |  |  |  |  |  |
| OTHER ORGANIC SOLVENTS | 1,6-HEXANEDIOL | b.p. = 250 |  |  |  |  |  |  |  |
|  | GLYCERIN | b.p. = 290 | 3 |  |  |  |  |  |  |
|  | HEXYLENE GLYCOL | b.p. = 197 |  |  |  |  |  |  |  |
|  | DIETHYLENE GLYCOL MONOETHYL ETHER | b.p. = 196 |  |  |  |  |  |  |  |
|  | 1,2-PENTANEDIOL | b.p. = 210 |  |  |  |  |  |  |  |
|  | 1,2-HEXANEDIOL | b.p. = 228 | 5 | 5 | 5 | 5 | 5 | 5 | 4 |
| SURFACTANT | SILICON BASE | SAG503A HLB = 11 |  |  |  |  |  |  |  |
|  |  | KF-353 HLB = 10 |  |  |  |  |  |  |  |
|  |  | SAG005 HLB = 7 | 1 | 1 | 1 | 1 | 1 | 1 | 1 |
|  |  | Tego Wet 280 HLB = 3.5 |  |  |  |  |  |  |  |
|  | ACETYLENE BASE | SURFYNOL 440 HLB = 8 |  |  |  |  |  |  |  |
| WAX | AQ513 |  | 0.5 | 0.5 | 0.5 | 0.5 | 0.5 | 0.5 | 0.5 |
| WATER |  |  | BALANCE | BALANCE | BALANCE | BALANCE | BALANCE | BALANCE | BALANCE |
| TOTAL |  |  | 100 | 100 | 100 | 100 | 100 | 100 | 100 |
| TOTAL MASS OF ORGANIC SOLVENTS |  |  | 23 | 23 | 22 | 27 | 23 | 23 | 17 |
| AVERAGE BOILING POINT OF ORGANIC SOLVENTS (° C.) |  |  | 213 | 207 | 196 | 199 | 205 | 200 | 200 |
| ORGANIC SOLVENT B/ORGANIC SOLVENT A |  |  | 0.5 | 2.0 | 0.1 | 0.5 | 0.5 | 0.5 | 0.4 |

|  |  | INFORMATION | INK 21 | INK 22 | INK 23 | INK 24 | INK 25 | INK 26 | INK 27 |
|---|---|---|---|---|---|---|---|---|---|
| PIGMENT | BLACK PIGMENT |  | 4 | 4 | 4 | 4 | 4 | 4 | 4 |
| ACRYLIC-BASED RESIN | JONCRYL 62J | Tg = 85 | 1 | 1 | 1 | 1 | 1 | 1 |  |
|  | SYNTHETIC RESIN 1 | Tg = 55 |  |  |  |  |  |  |  |
|  | SYNTHETIC RESIN 2 | Tg = 30 |  |  |  |  |  |  |  |
|  | SYNTHETIC RESIN 3 | Tg = 100 |  |  |  |  |  |  |  |
| ORGANIC SOLVENT A | PROPYLENE GLYCOL | b.p. = 184 | 8 | 12 | 12 | 12 |  |  | 12 |
|  | 1,2-BUTANEDIOL | b.p. = 194 |  |  |  |  |  |  |  |
| ORGANIC SOLVENT B | 1,3-PROPANEDIOL | b.p. = 209 | 10 |  |  |  | 6 | 18 |  |
|  | 1,4-BUTANEDIOL | b.p. = 230 |  |  |  |  |  |  |  |
|  | 1,5-PENTANEDIOL | b.p. = 238 |  |  |  |  |  |  |  |
| OTHER ORGANIC SOLVENTS | 1,6-HEXANEDIOL | b.p. = 250 |  |  |  |  |  |  |  |
|  | GLYCERIN | b.p. = 290 |  |  |  |  |  |  |  |
|  | HEXYLENE GLYCOL | b.p. = 197 |  |  |  |  | 6 | 12 |  6 |
|  | DIETHYLENE GLYCOL MONOETHYL ETHER | b.p. = 196 |  |  |  | 6 |  |  |  |
|  | 1,2-PENTANEDIOL | b.p. = 210 |  | 6 |  |  |  |  |  |
|  | 1,2-HEXANEDIOL | b.p. = 228 | 5 | 5 | 5 | 5 | 5 | 5 | 5 |

TABLE 2-continued

| SURFACTANT | SILICON BASE | SAG503A | HLB = 11 | | | | | | | |
|---|---|---|---|---|---|---|---|---|---|---|
| | | KF-353 | HLB = 10 | | | | | | | |
| | | SAG005 | HLB = 7 | 1 | 1 | 1 | 1 | 1 | 1 | 1 |
| | | Tego Wet 280 | HLB = 3.5 | | | | | | | |
| | ACETYLENE BASE | SURFYNOL 440 | HLB = 8 | | | | | | | |
| WAX | AQ513 | | | 0.5 | 0.5 | 0.5 | 0.5 | 0.5 | 0.5 | 0.5 |
| WATER | | | | BAL-ANCE | BAL-ANCE | BAL-ANCE | BAL-ANCE | BAL-ANCE | BAL-ANCE | BAL-ANCE |
| TOTAL | | | | 100 | 100 | 100 | 100 | 100 | 100 | 100 |
| TOTAL MASS OF ORGANIC SOLVENTS | | | | 23 | 23 | 23 | 23 | 23 | 23 | 23 |
| AVERAGE BOILING POINT OF ORGANIC SOLVENTS (° C.) | | | | 204 | 200 | 197 | 197 | 207 | 213 | 197 |
| ORGANIC SOLVENT B/ORGANIC SOLVENT A | | | | 1.3 | 0.0 | 0.0 | 0.0 | — | — | 0.0 |

The descriptions of the above Table 1 and Table 2 will be further described.

Components

The pigment, the acrylic-based resin, the surfactant, and the wax shown in Table 1 and Table 2 will be further described below.

Pigment
Black pigment: C.I. Pigment Black 7

Acrylic-Based Resin
Joncryl 62J: trade name, styrene-acrylic resin, manufactured by BASF Surfactant
SAG503A: "Silface SAG503A", trade name, silicone-based surfactant, manufactured by Nisshin Chemical Industry Co., Ltd.
KF-353: trade name, silicone-based surfactant, manufactured by Shin-Etsu Chemical Co., Ltd.
SAG005: "Silface SAG005", trade name, silicone-based surfactant, manufactured by Nisshin Chemical Industry Co., Ltd.
Tego Wet 280: trade name, silicone-based surfactant, manufactured by Evonik Degussa
Surfynol 440: trade name, acetylene glycol-based surfactant, manufactured by Nisshin Chemical Industry Co., Ltd.

Wax
AQ513: trade name, polyethylene wax, manufactured by BYK Japan KK.

Technical Terms
The technical terms described in Table 1 and Table 2 are as shown below.
"Tg": glass transition temperature (° C.)
"b.p.": standard boiling point (° C.)
"HLB": HLB (hydrophilic lipophilic balance) value calculated by Griffin method
"Total Mass of Organic solvents": Total of organic solvents
"Average Boiling Point of Organic Solvents": weight average boiling point (° C.) of all organic solvents contained in the ink jet ink composition 3.2. Recording Method As an ink jet printer, "SC-S80650" (trade name, manufactured by Seiko Epson Corporation") was prepared after being modified, and by using each of the individual ink jet ink compositions obtained as described above, recording was performed under the following printing conditions. During ink jet recording, as a primary heating mechanism, a platen heater was operated, and a surface temperature (maximum temperature in the recording) of a recording medium at a recording side located to face a recording head is shown as a primary drying temperature (primary heating temperature) in the following Table 3. In addition, in the ink jet printer used in Examples and Comparative Examples, downstream of the primary heating mechanism, a secondary heater was provided as a post-heating mechanism. As the secondary heater, an IR heater was used, the maximum surface temperature (maximum temperature in the post-heating step) of the recording medium at a recording side was set to 70° C., and a secondary heating was performed.

Printing Conditions
Ink to be used: shown in the following Table 3
Number of recording passes: shown in the following Table 3
Nozzle density of nozzle line of recording head: 360 dpi
Primary drying temperature: shown in the following Table 3
Secondary drying temperature: 70° C.
Ink adhesion amount: 7 mg/inch$^2$
Recording resolution: 720×720 dpi (the resolution is set such that in each recording of the recording passes, a certain number of ink droplets per one pass are selectively thinned out.)
Recording medium: "PET50A", trade name, PET film, manufactured by Lintec Corporation

TABLE 3

| INK | EXAMPLE 1 INK 1 | EXAMPLE 2 INK 2 | EXAMPLE 3 INK 3 | EXAMPLE 4 INK 4 | EXAMPLE 5 INK 5 | EXAMPLE 6 INK 6 | EXAMPLE 7 INK 7 | EXAMPLE 8 INK 14 | EXAMPLE 9 INK 15 |
|---|---|---|---|---|---|---|---|---|---|
| NUMBER OF RECORDING PASSES | 8 | 8 | 8 | 8 | 8 | 8 | 8 | 8 | 8 |
| PRIMARY drying TEMPERATURE | 45 | 45 | 45 | 45 | 45 | 45 | 45 | 45 | 45 |

TABLE 3-continued

| | | | | | | | | | |
|---|---|---|---|---|---|---|---|---|---|
| CONFORMABILITY | S | S | S | S | S | A | S | S | S |
| CLOGGING RESISTANCE | A | S | S | S | B | S | S | S | S |
| ADHESION | S | A | A | B | S | A | A | C | C |
| DRYING PROPERTY | S | A | A | B | S | S | A | C | C |

| INK | | EXAMPLE 10 INK 16 | EXAMPLE 11 INK 17 | EXAMPLE 12 INK 18 | EXAMPLE 13 INK 19 | EXAMPLE 14 INK 20 | EXAMPLE 15 INK 21 |
|---|---|---|---|---|---|---|---|
| | NUMBER OF RECORDING PASSES | 8 | 8 | 8 | 8 | 8 | 8 |
| | PRIMARY drying TEMPERATURE | 45 | 45 | 45 | 45 | 45 | 45 |
| | CONFORMABILITY | S | S | A | S | A | S |
| | CLOGGING RESISTANCE | C | S | A | B | B | A |
| | ADHESION | S | C | A | S | S | B |
| | DRYING PROPERTY | S | C | A | S | S | B |

| INK | EXAMPLE 16 INK 1 | EXAMPLE 17 INK 1 | EXAMPLE 18 INK 1 | EXAMPLE 19 INK 1 | COMPARATIVE EXAMPLE 1 INK 8 | COMPARATIVE EXAMPLE 2 INK 9 | COMPARATIVE EXAMPLE 3 INK 10 | COMPARATIVE EXAMPLE 4 INK 11 | COMPARATIVE EXAMPLE 5 INK 12 |
|---|---|---|---|---|---|---|---|---|---|
| NUMBER OF RECORDING PASSES | 6 | 4 | 8 | 8 | 8 | 8 | 8 | 8 | 8 |
| PRIMARY drying TEMPERATURE | 45 | 45 | 35 | 40 | 45 | 45 | 45 | 45 | 45 |
| CONFORMABILITY | A | B | S | S | C | S | S | C | S |
| CLOGGING RESISTANCE | A | A | S | S | S | D | D | S | D |
| ADHESION | A | B | B | A | S | C | S | S | S |
| DRYING PROPERTY | S | S | S | S | S | C | S | S | S |

| INK | COMPARATIVE EXAMPLE 6 INK 13 | COMPARATIVE EXAMPLE 7 INK 22 | COMPARATIVE EXAMPLE 8 INK 23 | COMPARATIVE EXAMPLE 9 INK 24 | COMPARATIVE EXAMPLE 10 INK 25 | COMPARATIVE EXAMPLE 11 INK 26 | COMPARATIVE EXAMPLE 12 INK 27 |
|---|---|---|---|---|---|---|---|
| NUMBER OF RECORDING PASSES | 8 | 8 | 8 | 8 | 8 | 8 | 8 |
| PRIMARY drying TEMPERATURE | 45 | 45 | 45 | 45 | 45 | 45 | 45 |
| CONFORMABILITY | S | B | B | B | C | C | B |
| CLOGGING RESISTANCE | S | D | D | D | B | S | A |
| ADHESION | D | S | S | S | D | D | D |
| DRYING PROPERTY | S | S | S | S | A | C | S |

3.3. Evaluation Method

As shown in Table 3, the conformability, the clogging resistance, the adhesion, and the drying property were evaluated. The evaluation methods thereof are as described below.

3.3.1. Evaluation of Conformability

A degree of color loss of an obtained printed matter was observed by visual inspection, and the conformability was evaluated by the following evaluation criteria. The color loss indicates a portion of a recording medium to which the ink is not adhered and at which the recording medium itself is viewed.

Evaluation Criteria

S: Ink sufficiently spreads, and color loss is not confirmed by visual inspection or a magnifying lens.

A: Ink appropriately spreads, and color loss is not confirmed by visual inspection.

B: Ink insufficiently spreads, and color loss is slightly confirmed by visual inspection.

C: Ink insufficiently spreads, and color loss is confirmed by visual inspection and is apparent.

3.3.2. Evaluation of Clogging Resistance

A printer was operated under the printing conditions of the recording method described above, and while being capped, the recording head was placed just next to a platen so as to be heated by the heat thereof and was then left for 1 month. Next, after non-ejection nozzles were recovered by performing a suction cleaning, a nozzle test was performed, and the clogging resistance was evaluated by the following evaluation criteria. In addition, by one suction cleaning, 1 cc of the ink was ejected from the nozzle line.

Evaluation Criteria

S: All nozzles are recovered by 3 cleanings or less.

A: All nozzles are recovered by 6 cleanings or less.

B: All nozzles are recovered after 6 cleanings+being left for 12 hours+3 cleanings.
C: All nozzles are recovered after 6 cleanings+being left for 12 hours+6 cleanings.
D: Some nozzles are not recovered.

3.3.3. Evaluation of Adhesion

By a Gakushin-type color fastness rubbing tester "AB-301" (trade name, manufactured by Tester Sangyo Co., Ltd.), a test in which a white cotton cloth (canequim No. 3) was reciprocally moved 50 times with a load of 500 g was performed (JIS P 8136: 1994) on the obtained printed matter. The adhesion was evaluated by the following evaluation criteria.

Evaluation Criteria
S: No peeling of image is confirmed.
A: Peeling of less than 10% of image is confirmed.
B: Peeling of 10% to less than 30% of image is confirmed.
C: Peeling of 30% to less than 50% of image is confirmed.
D: Peeling of 50% or more of image is confirmed.

3.3.4. Evaluation of Drying Property

Among the steps of the recording method described above, the secondary heating was not performed, and drying was performed in an air oven at 70° C. for a predetermined time. After a coating film surface of an obtained printed matter was rubbed with a cloth, whether or not the ink was adhered to the cloth was observed by visual inspection, and the drying property was then evaluated by the following evaluation criteria.

Evaluation Criteria
S: After drying is performed for 1 minute, no ink adhesion to cloth is observed.
A: After drying is performed for 2 minute, no ink adhesion to cloth is observed.
B: After drying is performed for 3 minute, no ink adhesion to cloth is observed.
C: After drying is performed for 3 minute, ink adhesion to cloth is observed.

3.4. Evaluation Results

In the above Table 3, the evaluation results are shown.

By comparison between Examples and Comparative Examples, it was found that in all Examples of the ink jet ink composition and the recording method according to this embodiment, the conformability to the recording medium is excellent, and in addition, the clogging resistance and the adhesion are also excellent.

On the other hand, in all Comparative Examples, at least one of the conformability to the recording medium, the clogging resistance, and the adhesion was inferior.

By comparison between Example 1 and Comparative Example 1, it was found that when the HLB value of the silicone-based surfactant is set to a predetermined value or less, the conformability is excellent. In addition, by comparison between Example 1 and Comparative Example 4, it was found that when the surfactant is a silicone-based surfactant, the conformability is excellent.

From the results of Examples 1, 5, and 6, it was found that in a wide range of the HLB value of the silicone-based surfactant, the conformability is excellent.

By comparison between Example 1 and Comparative Examples 5 and 6, it was found that when the acrylic-based resin has a glass transition temperature in a specific range, the clogging resistance and the adhesion are excellent.

From the results of Example 1 and Example 13, it was found that in a predetermined wide range of the glass transition temperature of the acrylic-based resin, the clogging resistance and the adhesion are excellent.

By comparison between Example 1 and Comparative Examples 2, 3, and 7 to 9, it was found that when the organic solvent includes a specific alkanediol having diols at both terminals, the clogging resistance is excellent.

From the results of Examples 1, 3, 4, and 7, it was found that when the number of carbon atoms of the alkanediol having diols at both terminals is 3 to 5, the clogging resistance is excellent.

By comparison between Example 1 and Comparative Examples 10 and 11, it was found that when the organic solvent includes a specific 1,2-alkanediol, the adhesion is excellent. In addition, it was also found that the drying property and the conformability are excellent.

From the results of Examples 1 and 12, it was found that when the number of carbon atoms of the 1,2-alkanediol is 4 or less, the conformability is excellent.

From the results of Examples 1, 2, 9, 10, and 15, it was found that when a mass ratio (B/A) of a content B of the specific alkanediol having diols at both terminals with respect to a total mass of the ink composition to a content A of the specific 1,2-alkanediol with respect to the total mass of the ink composition is in a predetermined range, the clogging resistance, the adhesion, and the drying property can be made more preferable at the same time.

From the results of Examples 1 and 8, it was found that when the weight average standard boiling point of the organic solvents is in a predetermined range, the adhesion and the drying property are more excellent.

From the results of Examples 1, 11, and 14, it was found that when the total content of the organic solvent with respect to the ink composition is in a predetermined range, the clogging resistance, the adhesion, and the drying property can be made more preferable at the same time.

From the results of Examples 1, 16, and 17, it was found that even when the number of recording passes is small, while a preferable conformability is secured, the clogging resistance and the adhesion can be made preferable at the same time.

From the results of Examples 1, 18, and 19, it was found that even when the primary drying temperature is low, the adhesion is excellent.

By comparison between Examples 1 and Comparative Examples 9 and 12, it was found that when the ink contains an acrylic-based resin having a glass transition temperature of 35° C. to 95° C., the adhesion is excellent, and the clogging resistance is a problem.

From the embodiments described above, the following conclusions are obtained.

An ink jet ink composition according to an aspect is a water-based ink and comprises: a colorant; a surfactant; a fixing resin; and an organic solvent. In the ink jet ink composition described above, the surfactant includes a silicone-based surfactant having an HLB value of 10.5 or less, the fixing resin includes an acrylic-based resin having a glass transition temperature of 35° C. to 95° C., and the organic solvent includes a 1,2-alkanediol having 4 carbon atoms or less and an alkanediol having diols at both terminals and 3 to 5 carbon atoms.

In the ink jet ink composition according to the aspect described above, a mass ratio (B/A) of a content B of the alkanediol having diols at both terminals and 3 to 5 carbon atoms with respect to a total mass of the ink composition to a content A of the 1,2-alkanediol having 4 carbon atoms or less with respect to the total mass of the ink composition may be 0.1 to 1.5.

In the ink jet ink composition according to the aspect described above, a total content of the organic solvent with respect to the total mass of the ink composition may be 30 percent by mass or less.

In the ink jet ink composition according to the aspect described above, the 1,2-alkanediol having 4 carbon atoms or less may include one of propylene glycol and 1,2-butanediol.

In the ink jet ink composition according to the aspect described above, the organic solvent contained in the ink composition may have a weight average standard boiling point of 195° C. to 205° C.

In the ink jet ink composition according to the aspect described above, the silicone-based surfactant may have an HLB value of 2 to 10.5.

In the ink jet ink composition according to the aspect described above, the alkanediol having diols at both terminals and 3 to 5 carbon atoms may include one of 1,3-propanediol, 1,4-butanediol, and 1,5-pentanediol.

In the ink jet ink composition according to the aspect described above, the organic solvent may be configured not to include a polyol having a standard boiling point of more than 280° C. at a content of more than 1 percent by mass with respect to a total mass of the ink composition.

In the ink jet ink composition according to the aspect described above, the acrylic-based resin may have a glass transition temperature of 40° C. to 90° C.

In the ink jet ink composition according to the aspect described above, the ink jet ink composition may be used for recording on a low-absorbing recording medium or a non-absorbing recording medium.

In the ink jet ink composition according to the aspect described above, the acrylic-based resin may include a styrene-acrylic resin.

A recording method according to another aspect comprises a step of ejecting the ink jet ink composition according to the aspect described above by an ink jet method so as to be adhered to a recording medium.

In the recording method according to the aspect described above, the recording medium may be a low-absorbing recording medium or a non-absorbing recording medium.

In the recording method according to the aspect described above, the recording method performs recording by main scannings, and the number of the main scannings preformed on the same scanning region may be 10 times or less.

The recording method according to the aspect described above may further comprise a primary heating step of heating the ink jet ink composition adhered to the recording medium, and the recording medium in the primary heating step may have a surface temperature of 40° C. or more.

The recording method according to the aspect described above may further comprise a post-heating step of heating the recording medium to which the ink jet ink composition is adhered.

The present disclosure is not limited to the embodiments described above and may be variously changed and/or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. An ink jet ink composition which is a water-based ink, the ink composition comprising:
   a colorant;
   a surfactant;
   a fixing resin; and
   an organic solvent,
   wherein the surfactant includes a silicone-based surfactant having an HLB value of 10.5 or less,
   the fixing resin includes an acrylic-based resin having a glass transition temperature of 35° C. to 95° C.,
   the organic solvent includes a 1,2-alkanediol having 4 carbon atoms or less and an alkanediol having diols at both terminals and 3 to 5 carbon atoms, and
   a mass ratio (B/A) of a content B of the alkanediol having diols at both terminals and 3 to 5 carbon atoms with respect to a total mass of the ink composition to a content A of the 1,2-alkanediol having 4 carbon atoms or less with respect to the total mass of the ink composition is 0.1 to 1.5.

2. The ink jet ink composition according to claim 1, wherein a total content of the organic solvent with respect to a total mass of the ink composition is 30 percent by mass or less.

3. The ink jet ink composition according to claim 1, wherein the 1,2-alkanediol having 4 carbon atoms or less includes one of propylene glycol and 1,2-butanediol.

4. The ink jet ink composition according to claim 1, wherein the silicone-based surfactant has an HLB value of 2 to 10.5.

5. The ink jet ink composition according to claim 1, wherein the alkanediol having diols at both terminals and 3 to 5 carbon atoms includes one of 1,3-propanediol, 1,4-butanediol, and 1,5-pentanediol.

6. The ink jet ink composition according to claim 1, wherein the acrylic-based resin has a glass transition temperature of 40° C. to 90° C.

7. The ink jet ink composition according to claim 1, wherein the ink jet ink composition is used for recording on a low-absorbing recording medium or a non-absorbing recording medium.

8. The ink jet ink composition according to claim 1, wherein the acrylic-based resin includes a styrene-acrylic resin.

9. An ink jet ink composition which is a water-based ink, the ink composition comprising:
   a colorant;
   a surfactant;
   a fixing resin; and
   an organic solvent,
   wherein the surfactant includes a silicone-based surfactant having an HLB value of 10.5 or less,
   the fixing resin includes an acrylic-based resin having a glass transition temperature of 35° C. to 95° C.,
   the organic solvent includes a 1,2-alkanediol having 4 carbon atoms or less and an alkanediol having diols at both terminals and 3 to 5 carbon atoms, and
   the organic solvent contained in the ink composition has a weight average standard boiling point of 195° C. to 205° C.

10. An ink jet ink composition which is a water-based ink, the ink composition comprising:
- a colorant;
- a surfactant;
- a fixing resin; and
- an organic solvent,
- wherein the surfactant includes a silicone-based surfactant having an HLB value of 10.5 or less,
- the fixing resin includes an acrylic-based resin having a glass transition temperature of 35° C. to 95° C.,
- the organic solvent includes a 1,2-alkanediol having 4 carbon atoms or less and an alkanediol having diols at both terminals and 3 to 5 carbon atoms, and
- the organic solvent is configured not to include a polyol having a standard boiling point of more than 280° C. at a content of more than 1 percent by mass with respect to a total mass of the ink composition.

11. An ink jet ink composition which is a water-based ink, the ink composition comprising:
- a colorant;
- a surfactant;
- a fixing resin; and
- an organic solvent,
- wherein the surfactant includes a silicone-based surfactant having an HLB value of 10.5 or less,
- the fixing resin includes an acrylic-based resin having a glass transition temperature of 35° C. to 95° C.,
- the organic solvent includes a 1,2-alkanediol having 4 carbon atoms or less and an alkanediol having diols at both terminals and 3 to 5 carbon atoms, and
- the recording method performs recording by main scannings, and
- the number of the main scannings preformed on the same scanning region is 10 times or less.

12. The recording method according to claim 11, wherein the recording medium is a low-absorbing recording medium or a non-absorbing recording medium.

13. A recording method comprising:
- ejecting an ink jet ink composition by an ink jet method so as to be adhered to a recording medium; and
- a primary heating step of heating the ink jet ink composition adhered to the recording medium,
- wherein the recording medium in the primary heating step has a surface temperature of 40° C. or more, and
- the ink jet ink composition which is a water-based ink includes:
  - a colorant;
  - a surfactant;
  - a fixing resin; and
  - an organic solvent,
  - wherein the surfactant includes a silicone-based surfactant having an HLB value of 10.5 or less,
  - the fixing resin includes an acrylic-based resin having a glass transition temperature of 35° C. to 95° C., and
  - the organic solvent includes a 1,2-alkanediol having 4 carbon atoms or less and an alkanediol having diols at both terminals and 3 to 5 carbon atoms.

14. A recording method comprising:
- electing an ink let ink composition by an ink let method so as to be adhered to a recording medium; and
- a post-heating step of heating the recording medium to which the ink jet ink composition is adhered,
- wherein the ink jet ink composition which is a water-based ink includes:
  - a colorant;
  - a surfactant;
  - a fixing resin; and
  - an organic solvent,
- wherein the surfactant includes a silicone-based surfactant having an HLB value of 10.5 or less,
- the fixing, resin includes an acrylic-based resin having a glass transition temperature of 35° C. to 95° C., and
- the organic solvent includes a 1,2-alkanediol having 4 carbon atoms or less and an alkanediol having diols at both terminals and 3 to 5 carbon atoms.

* * * * *